(12) United States Patent
Matsui et al.

(10) Patent No.: US 6,776,032 B2
(45) Date of Patent: Aug. 17, 2004

(54) MISFIRE DECIDING METHOD AND MISFIRE DECIDING SYSTEM FOR INTERNAL COMBUSTION ENGINES

(75) Inventors: Masayoshi Matsui, Aichi (JP); Koji Okazaki, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/135,767

(22) Filed: May 1, 2002

(65) Prior Publication Data

US 2002/0183919 A1 Dec. 5, 2002

(30) Foreign Application Priority Data

May 2, 2001 (JP) ........................................ 2001-135613

(51) Int. Cl.[7] .............................. G01L 3/26; G01L 5/13; G01M 15/00
(52) U.S. Cl. ..................................................... 73/117.3
(58) Field of Search ................................ 701/111, 110, 701/103; 73/116, 117.3, 115, 118.1; 123/491, 520, 672, 295, 436, 406.22, 673, 406.46, 527; 60/278, 284; 364/431.08; 390/441

(56) References Cited

U.S. PATENT DOCUMENTS

| | | | |
|---|---|---|---|
| 4,531,399 A | | 7/1985 | Aono |
| 5,076,098 A | * | 12/1991 | Miwa ........................... 73/115 |
| 5,127,262 A | | 7/1992 | Demizu et al. |
| 5,305,635 A | * | 4/1994 | James et al. ................... 73/116 |
| 5,309,756 A | * | 5/1994 | Osawa et al. ................. 73/116 |
| 5,351,528 A | | 10/1994 | Fukui et al. |
| 5,359,882 A | * | 11/1994 | Fukui ........................ 73/117.3 |
| 5,528,929 A | * | 6/1996 | Ikebuchi ....................... 73/116 |
| 5,529,041 A | * | 6/1996 | Andrews ..................... 123/436 |
| 5,611,754 A | * | 3/1997 | Haga et al. .................. 477/181 |
| 5,638,278 A | * | 6/1997 | Nishimura et al. .... 364/431.08 |
| 5,740,780 A | * | 4/1998 | Shimizu et al. .............. 123/425 |
| 5,775,298 A | * | 7/1998 | Haller ......................... 123/425 |
| 5,845,492 A | * | 12/1998 | Isobe et al. .................... 60/284 |
| 6,330,510 B1 | * | 12/2001 | Takaku et al. ............... 701/114 |
| 6,371,092 B1 | * | 4/2002 | Guglielmo et al. ......... 123/527 |

FOREIGN PATENT DOCUMENTS

| | | |
|---|---|---|
| JP | 4-072448 | 3/1992 |
| JP | 4-321752 | 11/1992 |
| JP | 4-325755 | 11/1992 |

OTHER PUBLICATIONS

European Search Report for EP 02 25 3097 dated Dec. 22, 2003.

* cited by examiner

Primary Examiner—Edward Lefkowitz
Assistant Examiner—Octavia Davis
(74) Attorney, Agent, or Firm—Sughrue Mion, PLLC

(57) ABSTRACT

A misfire deciding method for an internal combustion engine, which can be executed conveniently at low cost by using a gasket type pressure sensor and which can decide a misfire highly accurately and reproducibly. The internal pressure of an internal combustion engine having a spark plug mounted therein is measured by a pressure sensor (or a gasket type pressure sensor) mounted in the mounting seat of the spark plug. The measured information of the internal pressure for a period (or a before top dead center period) after an intake valve is closed and before the crank angle reaches top dead center is used as the before top dead center pressure information, and the measured information of the internal pressure for a period (or an after top dead center period) after the crank angle reaches the top dead center and before an exhaust valve is opened is used as the after top dead center pressure information. Misfire of the internal combustion engine is decided on the basis of misfire decision information obtained using the before top dead center pressure information and the after top dead center pressure information.

11 Claims, 17 Drawing Sheets

Fig. 11

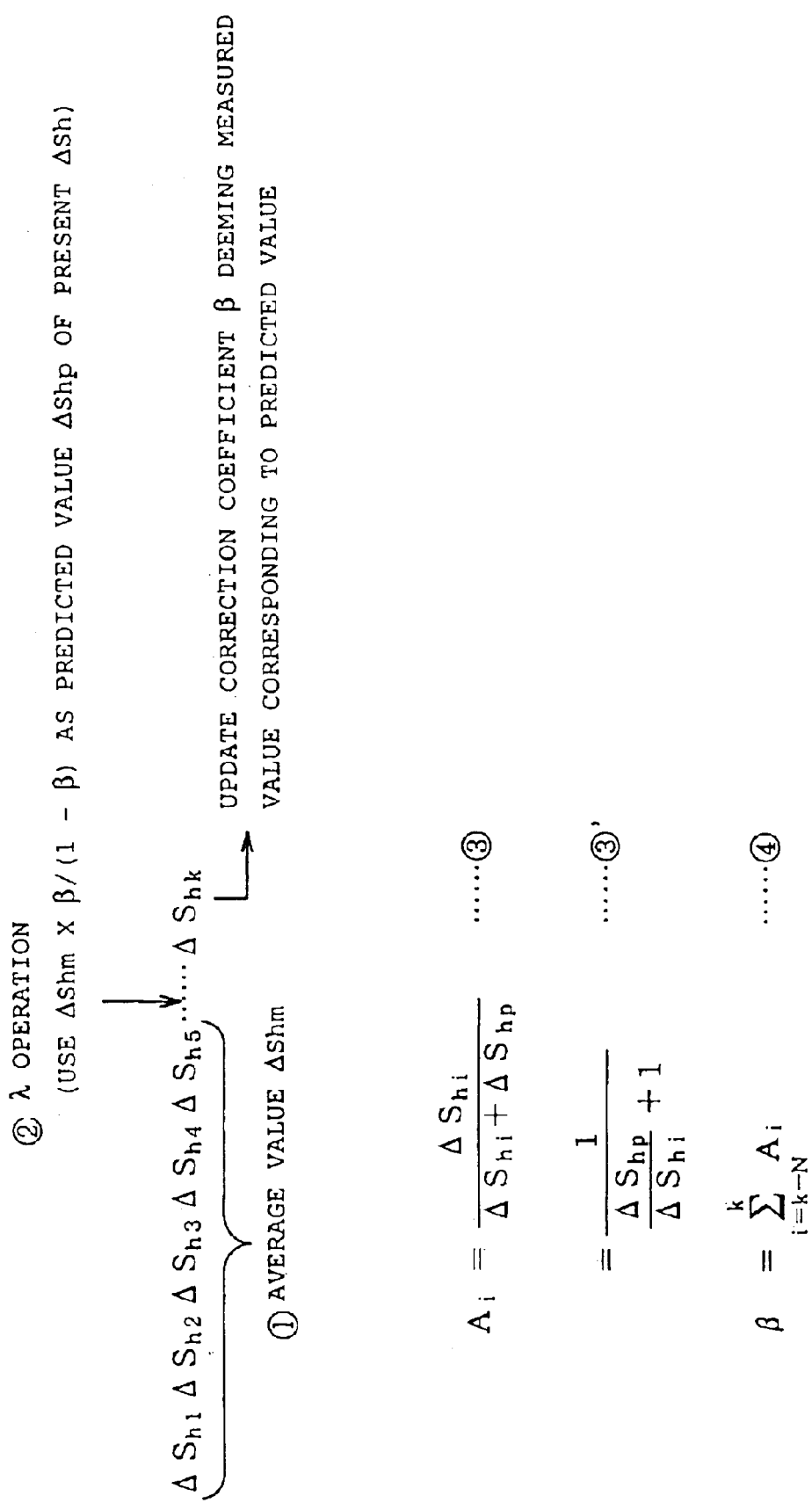

② λ OPERATION
(USE ΔShm × β/(1 − β) AS PREDICTED VALUE ΔShp OF PRESENT ΔSh)

ΔSh1 ΔSh2 ΔSh3 ΔSh4 ΔSh5 ···· ΔShk

① AVERAGE VALUE ΔShm

UPDATE CORRECTION COEFFICIENT β DEEMING MEASURED VALUE CORRESPONDING TO PREDICTED VALUE $$A_i = \frac{\Delta S_{hi}}{\Delta S_{hi} + \Delta S_{hp}} \qquad \cdots ③$$

$$= \frac{1}{\frac{\Delta S_{hp}}{\Delta S_{hi}} + 1} \qquad \cdots ③'$$

$$\beta = \sum_{i=k-N}^{k} A_i \qquad \cdots ④$$

MISFIRE DECIDING METHOD AND MISFIRE DECIDING SYSTEM FOR INTERNAL COMBUSTION ENGINES

BACKGROUND OF THE INVENTION

1. Field the Invention

The present invention relates to a misfire deciding method and system for an internal combustion engine.

2. Description of the Related Art

As a misfire deciding method in an internal combustion engine, a method has been proposed for directly measuring the pressure in a combustion chamber, for example, by forming a pressure conduit leading to the combustion chamber in a cylinder head and by arranging a partition type pressure sensor in the pressure conduit. The formation of this pressure conduit in the cylinder head, however, involves complex machining which inevitably raises the manufacturing cost. A more convenient method for measuring the internal pressure uses a pressure sensor (hereinafter called a "gasket type pressure sensor") which is mounted on the mounting seat of a spark plug, as disclosed, for example, in Japanese Patent Laid-Open No. 290853/1994.

FIG. 3 exemplifies an internal pressure profile as measured by an internal pressure sensor for one cycle in the combustion engine. The solid curve indicates the profile for normal combustion timing, and the single-dotted curve indicates the profile for a misfire timing. When an intake valve is closed, the inside of the combustion chamber is sealed, and the mixture is compressed as a piston rises, so that the internal pressure rises. Moreover, the spark plug sparks at a crank angle (or an ignition timing) before top dead center (TDC). When the mixture is normally ignited with that spark, the internal pressure is further raised by the explosion of the mixture. By this pressure rise, the rise in the internal pressure is continued for a while, even after the piston passes through the TDC and turns downward, and the internal pressure is reduced after the piston goes down to some extent. Therefore, the internal pressure measured profile assumes an asymmetric shape in which the peak position is shifted to a larger angle side than the crank angle (i.e., an $\alpha$TDC) corresponding to the TDC. When the ignition ends unsuccessfully with a misfire, on the other hand, no pressure rise due to the explosion occurs so that the pressure assumes a maximum value at the TDC where the volume in the combustion chamber is at a minimum. After this, the piston moves down with the pressure change merely following a profile which is inverted relative to that of the rising time. Therefore, the internal pressure measured profile thus obtained is generally symmetric so as to have a peak position at the $\alpha$TDC. Thus, between the normal combustion time and the misfire time, differences apparently occur both in the peak value of the internal pressure measured profile and in the symmetry of the profile.

However, the misfire decision using only one point of the internal pressure peak value level has numerous error factors and lacks accuracy because it does not take into consideration the tendency of the entire profile. Japanese Patent Laid-Open Nos. 321752/1992, 72448/1992 and 325755/1992, therefore, discloses a method for deciding a misfire by comparing the magnitudes of a before top dead center pressure integrated value $S_1$ obtained by integrating the internal pressure measured values for a constant integration period defined in the before top dead center period and an after top dead center pressure integrated value $S_2$ obtained by integrating the average pressure information for a constant integration period defined in the after top dead center period. In short, by using the integrated values, the tendency of the entire internal pressure measured profile can be reflected in an average form on the decision result so that a more accurate misfire decision can be made.

Here, the method using the gasket type pressure sensor indirectly measures the internal pressure, in that the fastening force of the spark plug fixing the sensor is loosened by the internal pressure. As compared with the method of measuring the internal pressure directly through the pressure conduit by using the partition type sensor, therefore, there are a number of factors causing the absolute value of the measured pressure value to fluctuate. More specifically, variations in the force for fastening the spark plug and in the performance of individual piezoelectric elements easily cause the measured value level of the internal pressure to fluctuate, such that the measured value and its integrated value vary for a given internal pressure, easily resulting in an erroneous decision. In the above-specified patent publications, however, there is no disclosure of any specific means for reducing the adverse influences of these variation-causing factors.

SUMMARY OF THE INVENTION

It is therefore an object of the present invention to provide a misfire decision method and system for an internal combustion engine, which can be executed conveniently and inexpensively by using a gasket type pressure sensor and which can at all times make an accurate misfire decision while being hardly influenced by variations in the mounting arrangement or performance of the piezoelectric elements.

In order to achieve the above-specified object, the invention provides a misfire deciding method for an internal combustion engine, characterized by:

acquiring an internal pressure measured value based on the internal pressure of an internal combustion engine, to which a spark plug is attached, from the output of a pressure sensor mounted in a mounting seat of the spark plug;

calculating the integrated value of the internal pressure measured values for a first constant integration period in a period (as will be called the "before top dead center period") after an intake valve is closed and before a crank angle reaches top dead center, and setting the calculated value to a before top dead center integrated value $S_1$;

calculating the integrated value of the internal pressure measured values for a second constant integration period in a period (as will be called the "after top dead center period") after the crank angle reaches top dead center and before an exhaust valve is opened, and setting the calculated value to an after top dead center integrated value $S_2$;

calculating a differential integrated value $S_1-S_2$ between the after top dead center integrated value $S_2$ and the before top dead center integrated value $S_1$; and calculating a first correction reference value using the internal pressure measured value at a correction measurement point set for the before top dead center period, to correct the differential integrated value with the first correction reference value, to thereby make a misfire decision on the basis of the corrected differential integrated value.

The invention provides a misfire deciding system for an internal combustion engine, comprising:

a pressure sensor mounted in a mounting seat of a spark plug for acquiring an internal pressure measured value based on the internal pressure of an internal combustion engine having the spark plug mounted therein; and a decision unit for: calculating the integrated value of the internal pressure measured values for a first constant integration period in a period (as will be called the "before top dead center period") after an intake valve is closed and before a crank angle reaches the top dead center, and setting the calculated value to a before top dead center integrated value $S_1$; calculating the integrated value of the internal pressure measured values for a second constant integration period in a period (as will be called the "after top dead center period") after the crank angle reaches top dead center and before an exhaust valve is opened, and setting the calculated value to an after top dead center integrated value $S_2$; calculating a differential integrated value $S_1-S_2$ between the after top dead center integrated value $S_2$ and the before top dead center integrated value $S_1$; and calculating a first correction reference value using the internal pressure measured value at a correction measurement point set for the before top dead center period, to correct the differential integrated value with the first correction reference value, to thereby make a misfire decision on the basis of the corrected differential integrated value.

In the misfire deciding method and system of the invention, as shown in FIG. 4, the internal pressure measured profile for a constant period before and after the top dead center is determined so that the misfire decision may be made on the basis of the difference between the before top dead center pressure integrated value $S_1$ and the after top dead center pressure integrated value $S_2$, as obtained for the before top dead center period and for the after top dead center period, respectively, that is, the differential integrated value $\Delta S \equiv (S_2-S_1)$. The method of making the misfire decision on the basis of the differential integrated value $\Delta S$ is convenient and is advantageous for easily canceling the influence of thermally caused drifts of the internal pressure measured values as described below. In either event, however, the misfire decision using the gasket type pressure sensor is easily caused to exert influences on the internal pressure measured value level due to variation in the fastening force of the sensor by the spark plug or in the performance of the piezoelectric element.

In the invention, therefore, the correction measurement point is set for the before top dead center period, and the first correction reference value is calculated using the internal pressure measured value at the correction measurement point, to correct the differential integrated value $\Delta S$ with the first correction reference value, to thereby make the misfire decision on the basis of the corrected differential integrated value $\Delta S$. The correction measurement point set within the before top dead center period is relatively hardly influenced by the pressure rise due to the ignition/explosion of the fuel so that the internal pressure measured value obtained at the measurement point can be used as the reference value. By standardizing the individual measured values forming the internal pressure measured profile in comparison with that reference value, therefore, fluctuations in the internal pressure measured value levels due to the aforementioned factors can be suppressed to make a misfire decision of a higher accuracy.

At an idling time or at the time of running on level ground at constant speed, for example, the air-fuel ratio or the fuel consumption rate are substantially constant. If the crank angle at the correction measurement point is known, therefore, the internal pressure can be estimated from the volume of the combustion chamber at the correction measurement point. If the internal pressure measured value with the gasket type pressure sensor is corrected to match the estimated value of the internal pressure, therefore, the internal pressure measured value can be standardized even with variation in the sensor fastening force and in the piezoelectric element performance.

In the vigorously changing situation of the running state of the internal combustion engine, on the other hand, the absolute value of the internal pressure is difficult to estimate even if the correction measurement point is set at the common crank angle position. According to the following method, however, the correction to standardize the internal pressure measured value can be rationally made without such an absolute value estimation. As shown in FIG. 4, more specifically, two different correction measurement points are set within the before top dead center period, and a first correction reference value is calculated as a difference of $\Delta P_0 \equiv P_2-P_1$ between the internal pressure measured values $P_1$ and $P_2$ obtained for those two correction measurement points. If these two correction measurement points are individually set at constant crank angle positions, the volumetric change in the gas between the two correction measurement points always takes a determined value, and the difference $\Delta P_0$ has a meaning as the reference pressure change corresponding to the constant volumetric change. The measured value of the difference $\Delta P_0$ fluctuates with the aforementioned dispersions in the fastening forces or the piezoelectric element performances, and the internal pressure measured value to be used for the misfire decision also fluctuates with the same tendency. If the internal pressure measured value is displayed by correcting it with a relative value calculated by dividing it by the difference $\Delta P_0$ for the reference pressure change, therefore, the influences of the aforementioned dispersions can be effectively reduced not through the absolute value correction of the internal pressure.

Next in the invention for making the misfire decision with the differential integrated value $\Delta S$, the value of $(S_1-S_2)/\Delta P_0$ calculated by the division with the difference $\Delta P_0$ of the internal pressure measured value or the first correction reference value is calculated (Formula (1) of FIG. 4) as a decision index $\lambda$, and the misfire decision is made on the basis of the decision index $\lambda$. Then, the misfire decision using the value $\Delta S$ can be made more accurately and reproducibly. Even if the peak value of the internal pressure measured profile fluctuates by the aforementioned factors so that the measured value $\Delta S$ itself takes a different value such as $\Delta S_A$ $(=S_{2A}-S_{1A})$ and $\Delta S_B$ $(=S_{2B}-S_{1B})$, as shown in FIGS. 5(a) and 5(b), the influences of the fluctuations can be drastically reduced by dividing those values by the aforementioned differences $\Delta P_{OA}$ and $\Delta P_{OB}$.

For these integrations, it is necessary to measure the internal pressure $P$ as a function of time or crank angle. In FIG. 4, the internal pressure is measured as a function $P(\alpha)$ of the crank angle $\alpha$. When the integration period of the before top dead center period is expressed by $[\alpha 1, \alpha TDC]$ whereas the integration period of the after top dead center period is expressed by $[\alpha TDC, \alpha 2]$, for example, the values $S_1$ and $S_2$ can be calculated on the basis of Formulas (2) and (3) of FIG. 4. In the computer processing, the values $S_1$ and $S_2$ are calculated by numerical integrations by sampling the internal pressure measured value $P$ at every minute angles $\delta\alpha$ while monitoring the crank angle $\alpha$ by a crank angle sensor or the like. In case the correspondence between the crank angle $\alpha$ and the time can be grasped, the integration variable should not be limited to the crank angle $\alpha$ but can be exemplified by the time t in a more convenient method. In order to lighten the influences of the engine speed (for a period of one cycle), it is then effective to average and use the time-integrated value of the internal pressure measured value P by the measured value of the prevailing engine speed.

Hereinafter, the integrated value of the internal pressure measured value P conceptionally includes not only the mathematically integral value (Formulas (2) and (3) of FIG. 4, as will be called the "mathematically integrated value") by the integral variable when the value P is expressed as a function of the crank angle $\alpha$ (or another parameter (e.g., the time t) which can correspond one to one to the value $\alpha$) as the integral variable but also another operation value, if this value reflects the integrated value. If the sampling interval of the internal pressure measured value is constant, for example, the added value of the sampled internal pressure measured values for a constant period is the operation value reflecting the mathematically integrated value so that it can be adopted as the integrated value, as defined herein. Moreover, the value calculated by dividing the mathematically integrated value or the added value by the width of the integration period or the number of added data expresses the average value of the internal pressure measured values for the individual periods and can be adopted as the integrated value, as defined herein.

If it is considered that the measurements of the internal pressure are ideally done, the differential integrated value $\Delta S$ is zero at the misfire. It is, therefore, theoretically possible to decide the combustion to be a misfire, if the value $\Delta S$ is zero, and to be normal if larger than zero. In the practical situations, however, due to various error factors (e.g., the influences due to the later-described hysteresis), the value $\Delta S$ does not become zero but is measured as a finite value even at the misfire. In this case, more or less of a margin is introduced into the decision reference for the value $\Delta S$ considering that error. In case the value $\Delta S$ becomes smaller than a positive lower limit, it is effective for avoiding the erroneous decision to decide the misfire. Here in another method, the integration period of the before top dead center period is set so longer as to correspond to the aforementioned margin of the decision reference. Then, it is also possible to decide the misfire, if the value $\Delta S$ takes zero or a negative value, and the normal combustion if larger than zero. In this case, strictly speaking, the integration period of the before top dead center period and the integration period of the after top dead center period are not equal.

In case the integration periods are set to an equal duration for the before top dead center period and the after top dead center period (that is, $\alpha TDC - \alpha 1 = \alpha 2 - \alpha TDC$: Formula (4) of FIG. 4), the following new effects can be attained. Specifically, the gasket type pressure sensor used for the internal pressure measurement has a sensor element comprising piezoelectric ceramics. On the other hand, most piezoelectric ceramics exhibit pyroelectrcity as the temperature rises. Therefore, the pressure sensor element using the piezoelectric ceramics has a problem that the zero point of the sensor output is liable to drift when the temperature changes. FIG. 6(a) schematically illustrates the internal pressure measured profile in a steady state (at a low temperature), and FIG. 6(b) schematically illustrates the internal pressure measured profile in a transient state (at a high temperature). By the influences of the zero-point drifts due to the temperature, the internal pressure measured profiles are evenly shifted over the entire measurement period, if the period is so short as to cause no problem in the temperature change. If the integration periods are equally set for the before top dead center period and the after top dead center period, therefore, the influences of the zero-point drifts can be offset at the operation of $\Delta S \equiv S_2 - S_1$, so that the misfire decision can be made more accurately.

In the misfire decision using the value $\Delta S$, for effectively retaining accuracy, the difference of the value $\Delta S$ between the normal combustion time and the misfire time is as large as possible. From this viewpoint, it is effective that the ending point of the integration period set for the before top dead center period and the starting point of the integration period set for the after top dead center period are individually made identical to a top dead center $\alpha TDC$, as illustrated in FIG. 4. So long as the necessary and sufficient misfire decision accuracy can be retained when the integration period of the before top dead center period is set long for the aforementioned object, however, it is possible either to join the ending point of the integration period set for the before top dead center period and the starting point of the integration period set for the after top dead center period at a position (e.g., at a position deviated to the larger angle side) other than the top dead center $\alpha TDC$, or to provide a short non-integration period between the ending point of the integration period set for the before top dead center period and the starting point of the integration period set for the after top dead center period.

Next, for the aforementioned misfire decision, still another correction can be made by the following method. Specifically, a second correction reference value is calculated on the basis of the internal pressure measured value of the combustion cycle (or the estimated misfire cycle) estimated in advance to be the misfire cycle, to correct the differential integrated value $\Delta S$ with the second correction reference value.

This correction is made effective by the following background intrinsic to the gasket type pressure sensor. FIG. 7(a) illustrates the results (in a solid curve) of the internal pressure measured value profile measured by the gasket type pressure sensor at the normal combustion time, in comparison with the results (in a broken curve) measured by a partition type standard pressure sensor through a pressure conduit formed in the cylinder head. It is thought that the measured values per se indicate the values more approximately from the true internal pressure. In the measurements by the gasket type pressure sensor, it is found that the profile at the pressure dropping time appears to shift to the higher pressure side than the profile at the pressure rising time. For example, FIG. 7(b) plots the measured value P of the seated pressure sensor corresponding to a common crank angle, against a measured value P' of a corresponding standard pressure sensor. It is found that the curves are different between the pressure rising time and the pressure dropping time thereby showing a clear hysteresis. On the other hand, FIG. 9 plots the decision index $\lambda$ obtained using two gasket type pressure sensors of common specifications, against a decision index $\lambda_0$ obtained by the standard sensor. By adopting the decision index $\lambda$, the two linear curves have substantially equal gradients. It is, however, found that the values (i.e., $\lambda_{hA}$ and $\lambda_{hB}$) at $\lambda_0=0$, i.e., at the misfire time indicate considerably different values due to the difference of the hysteresis.

This hysteresis is thought to occur because the compressive gas forced at the pressure rising time into the thread valley or gasket of the spark plug providing the portion to be mounted in the internal combustion engine is not promptly released at the pressure dropping time but remains. In either event, it is apparent from FIG. 7(a) that the profile at the pressure rising time is raised by the influences of the hysteresis to deteriorate the symmetry of the measured value profile curves important for the misfire decision. In the decision using the integrated values $S_1$ and $S_2$, the integrated value $S_2$ of the after top dead center pressure is directly increased. It is, therefore, effective for improving the decision accuracy to correct the internal pressure measured value at the pressure dropping time thereby lessening the influences due to that hysteresis.

The frequency of occurrence of the hysteresis cannot be generally estimated unless the aforementioned standard sensor is used. Only at the misfire time, however, that frequency can be determined directly from the internal pressure measured value without providing the standard sensor. Specifically, the internal pressure measured value profile at the misfire time should theoretically be symmetric with respect to the top dead center position, as indicated by a broken curve in FIG. 8. However, the profile at the pressure dropping time is raised to the extent of the hysteresis, although the misfire occurs without the hysteresis. By comparing this profile with the profile at the rising time, therefore, it is possible to estimate the rising extent of the internal pressure measured value due to the hysteresis. In other words, the rising extent of the internal pressure measured value is calculated as the second correction reference value on the basis of the internal pressure measured value of the combustion cycle (or the estimated misfire cycle) which has been found in advance to become the misfire cycle.

In order to estimate the rising extent of the internal pressure measured value accurately, it is necessary to use the internal pressure measured value in the cycle which has been fixed for that at the misfire time, i.e., in an estimated misfire cycle. This internal pressure measured value ordinarily never fails to occur at the fuel cutting time for an abrupt deceleration while the internal combustion engine for an automobile is running. In case the misfire decision unit is commonly used for an ECU (Electronic Control Unit) for controlling the ignition timing or the air/fuel ratio of the internal combustion engine, for example, or in case the misfire decision unit can acquire its control information from the ECU although not used for the ECU, therefore, the misfire decision unit can grasp the occurrence of the estimated misfire cycle reliably and can calculate the second correction reference value without any problem.

As shown in FIG. 8, the second correction reference value can be calculated as a value reflecting the differential integrated value $S_h$ in the estimated misfire cycle. In case the differential integrated value $\Delta S$ itself is used as the misfire deciding information, the correction may be done by subtracting the value $S_h$ or the second correction reference value from the value $S_2$ of the value $\Delta S$. In the misfire decision using the aforementioned decision index $\lambda$ $(=\Delta S/\Delta P_0)$, on the other hand, the second correction reference value can use the decision index $\lambda$ obtained in the estimated misfire cycle, as a correction value $\lambda_{hp}$, and the decision index $\lambda$ obtained in the combustion cycle other than the estimated misfire cycle can be corrected, in a manner to subtract the correction value $\lambda_{hp}$. In either case, it is possible to make the accurate misfire decision, in which the influences of the hysteresis are lightened.

Here, the second correction reference value can be also calculated on the basis of the internal pressure measured value in a plurality of estimated misfire cycles having occurred in the past. For example, when the increment of the internal pressure measured value due to the hysteresis is expected to be varied with the time due to the occurring timing of the estimated misfire cycle, a more reliable value of the second correction reference value can be attained by further including a statistical process such as averaging the internal pressure measured values of a plurality of the estimated misfire cycles having occurred in the past.

BRIEF DESCRIPTION OF THE DRAWINGS

FIG. 11 is a diagram explaining the concept of the correction value $\lambda_{hp}$ of the decision index $\lambda$;

DESCRIPTION OF THE PREFERRED EMBODIMENT

An embodiment of the invention will be described with reference to the accompanying drawings. However, the present invention should not be construed as being limited thereto.

Figure 1:
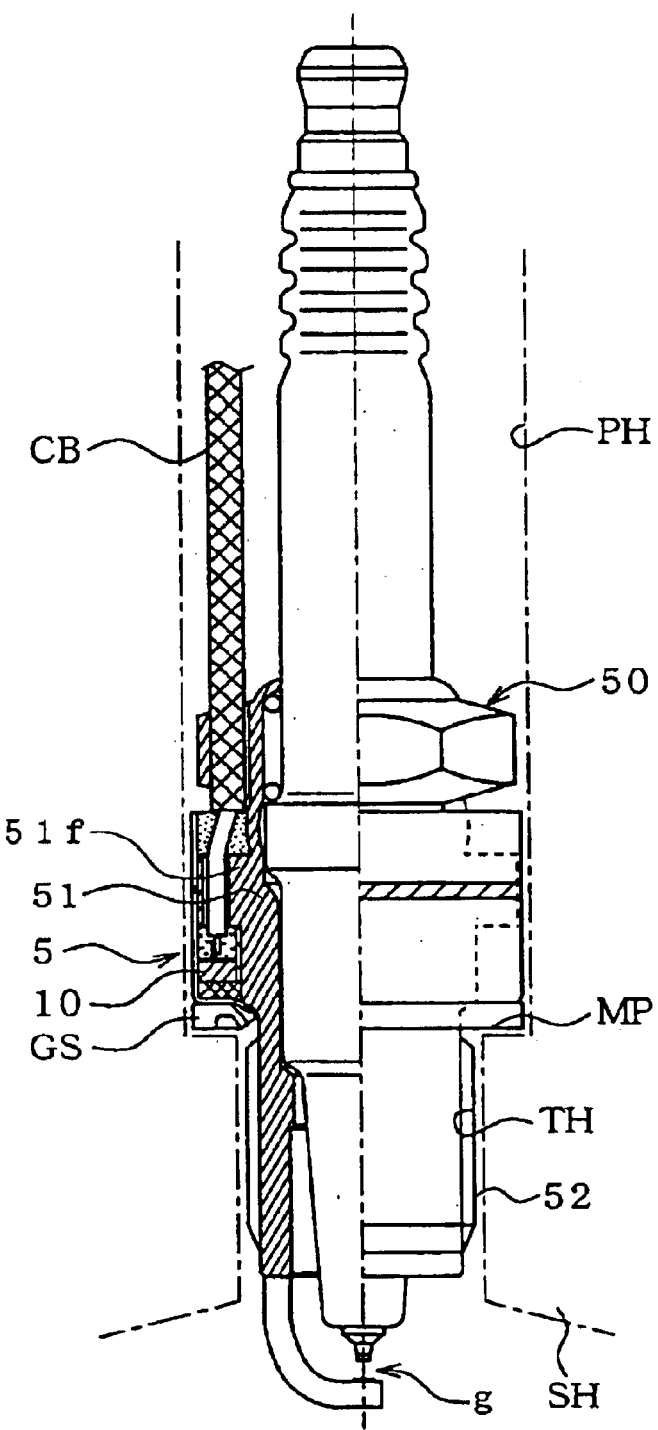
FIG. 1 is a longitudinal section showing one example of the mounting mode of a gasket type pressure sensor.

FIG. 1 shows one example of the mounting mode of a gasket type pressure sensor. Specifically, a spark plug 50 has a fastened thread portion 52 formed in the outer circumference of the leading end portion of a main fixture 51. The spark plug 50 is so fastened in a thread TH formed in the bottom of a plug hole PH, by fastening the fastened thread portion 52 into the thread TH so that a spark discharge gap g may be positioned in a combustion chamber ER with respect to a cylinder head SH of an internal combustion engine configured as an automobile engine. Moreover, a flanged mounting seat 51f is formed to protrude from the outer circumference of the main fixture 51 at a position adjoining the base end portion of the fastened thread portion 52. On the other hand, a gasket type pressure sensor 5 has a ring-shaped sensor element 10 made of piezoelectric ceramics, which is clamped together with a ring-shaped gasket GS under a constant bias pressure in the axial directions between the mounting seat portion 51f and an open peripheral edge portion MP of the thread TH.

As a pressure in the combustion chamber ER rises, i.e., an internal cylinder pressure rises, the spark plug 50 receives the pressure in the axial directions so that the bias pressure applied to the sensor element 10 changes. As a result, the generation of piezoelectric charges in the sensor element 10 changes so that a correspondingly varying signal is extracted as a measured internal cylinder value P through an output cable CB.

Figure 2:
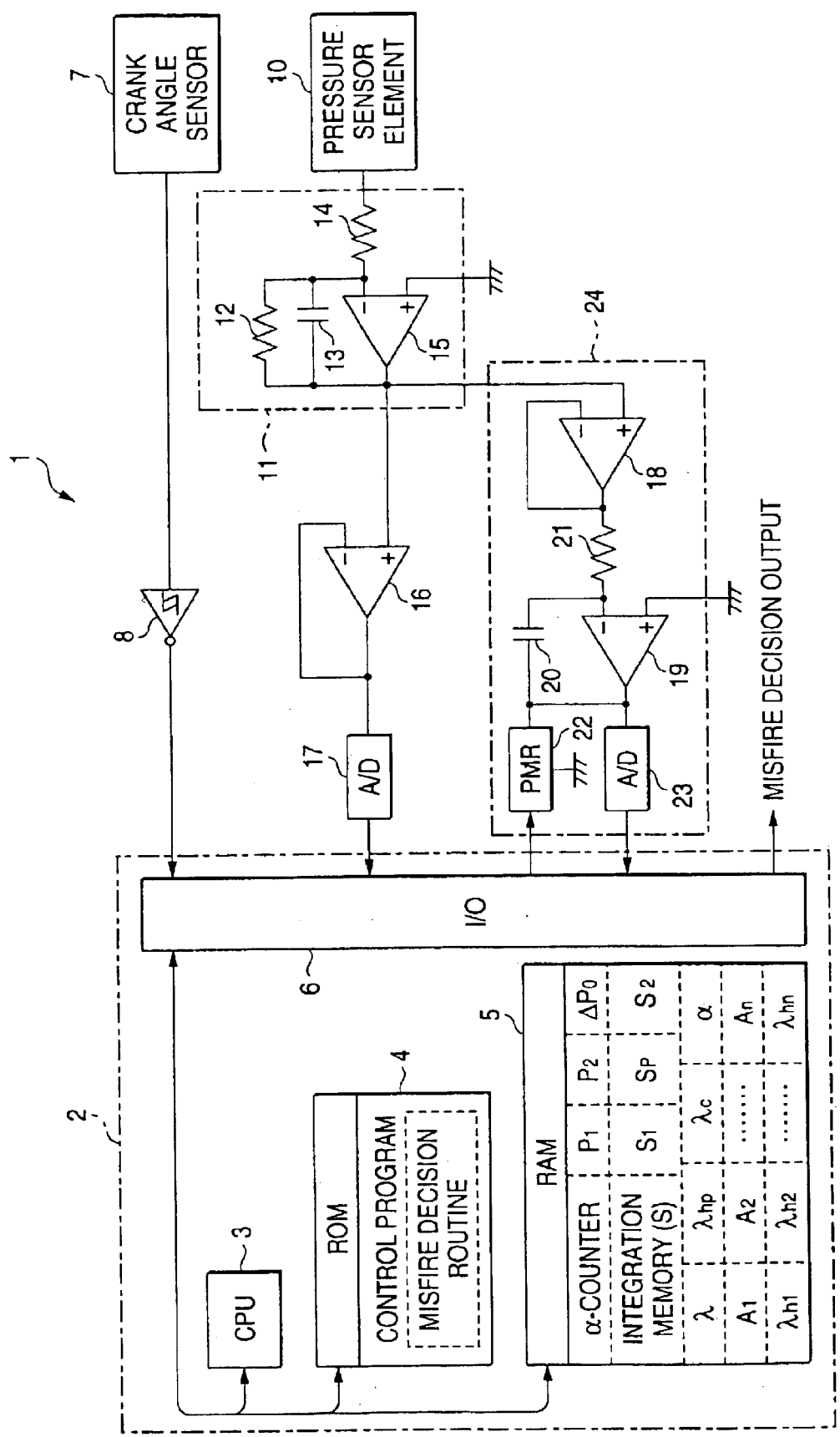
FIG. 2 is a block diagram showing one example of the electric construction of a misfire decision unit of the invention.
Figure 3:
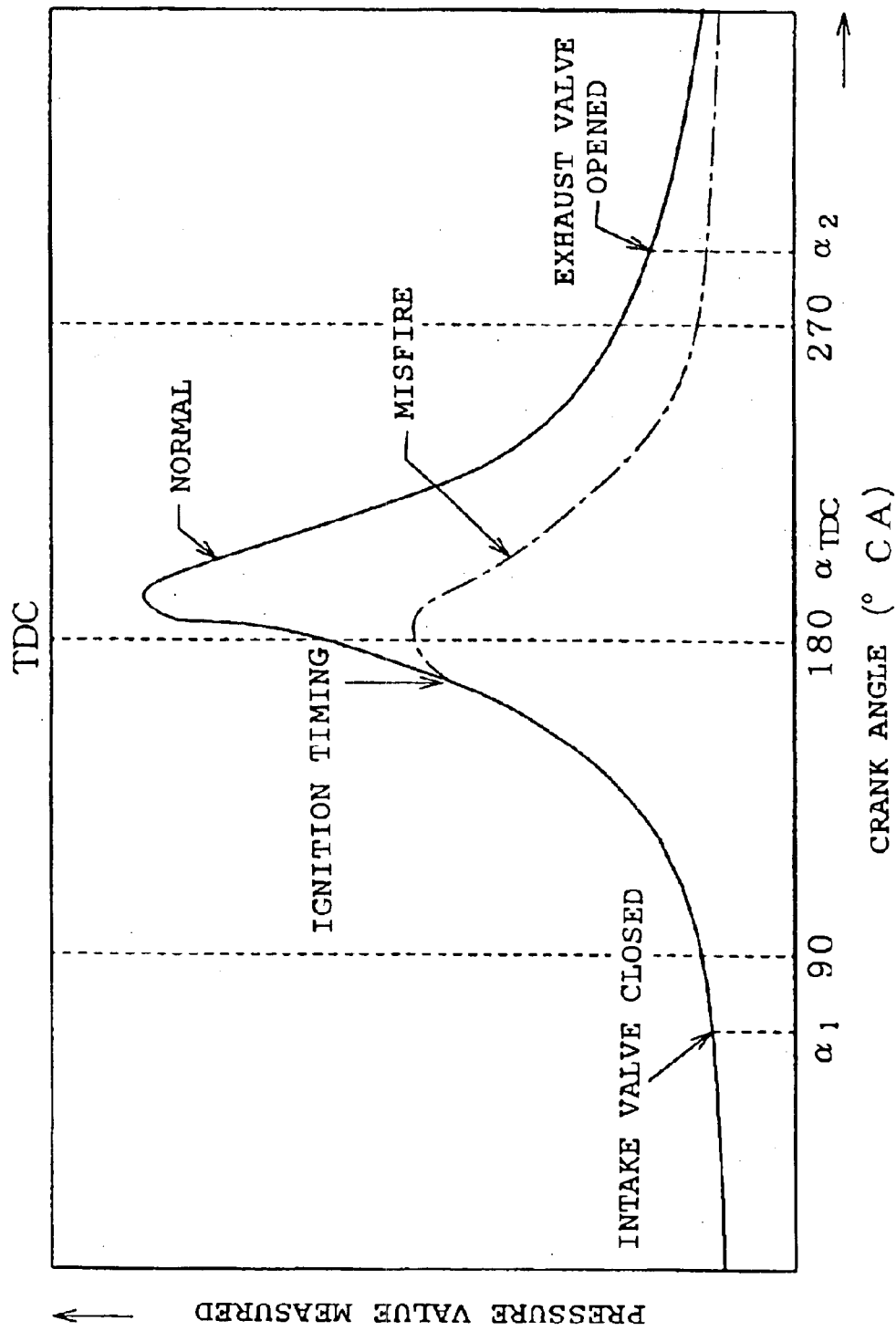
FIG. 3 is a diagram showing internal pressure measured profiles by comparing a misfire time and a normal combustion time.

FIG. 2 is a block diagram showing one example of a misfire decision unit in accordance with the invention using the gasket type pressure sensor 5. A misfire decision unit 1 has a main construction of an ECU 2 comprising a computer and executes control over such drive parameters of an internal combustion engine as an ignition timing or an air/fuel ratio, together with the misfire decision. Here, the construction and functions of the ECU 2 are well known in the art excepting the misfire deciding function to be described hereinafter, and the following description will be focused on that misfire deciding function.

The ECU 2 is constructed as a computer in which a CPU 3, a ROM 4, a RAM 5 and an input/output interface 6 are interconnected through a bus. The ROM 4 stores a control program defining the control processing functions of the ECU 2 and having a misfire decision routine incorporated therein. The CPU 3 realizes the function of the ECU 2 by executing the control program using the RAM 5 as a work memory.

A crank angle sensor 7 for detecting the crank angle of the internal combustion engine is connected to the input/output interface 6. The crank angle sensor 7 is, for example, a pulse generator for detecting the rotational angle of the crankshaft. The pulse signal of the pulse generator is inputted to a predetermined port of the input/output interface 6 via a Schmitt trigger 8. Moreover, the speed of the engine and the duration of one cycle can be monitored in real time with the interval of input pulses coming from the crank angle sensor 7.

Next, the pressure sensor element 10 is connected with the input/output interface 6 through a charge amplifier circuit 11. In this charge amplifier circuit 11, the output cable from the pressure sensor element 10 is connected with a negative input terminal of an operation amplifier 15, the positive input terminal of which is grounded (thereby forming an inverted amplifier using ground level as a reference voltage). As a pressure is developed in the combustion chamber, the pressure sensor element 10 (FIG. 2) generates a charge. As a result, a negative feedback capacitor 13 connected with the operation amplifier 15 stores a charge balancing that generated charge, and its terminal voltage is inputted as a voltage-transformed charge signal to the negative input terminal of the operation amplifier 15. Therefore, the operation amplifier 15 forms a charge voltage transforming circuit together with the negative feedback capacitor 13 so as to output the charge developed in the pressure sensor element 10 as an amplified voltage signal. A resistor 12 connected in parallel with the negative feedback capacitor 13 promotes the discharge of the negative feedback capacitor 13, when the generated charge level of the pressure sensor element 10 turns negative, and prevents output saturation of the operation amplifier 15. On the other hand, a resistor 14 on the signal line from the pressure sensor element 10 protects the terminals of the operation amplifier 15.

Figure 4:
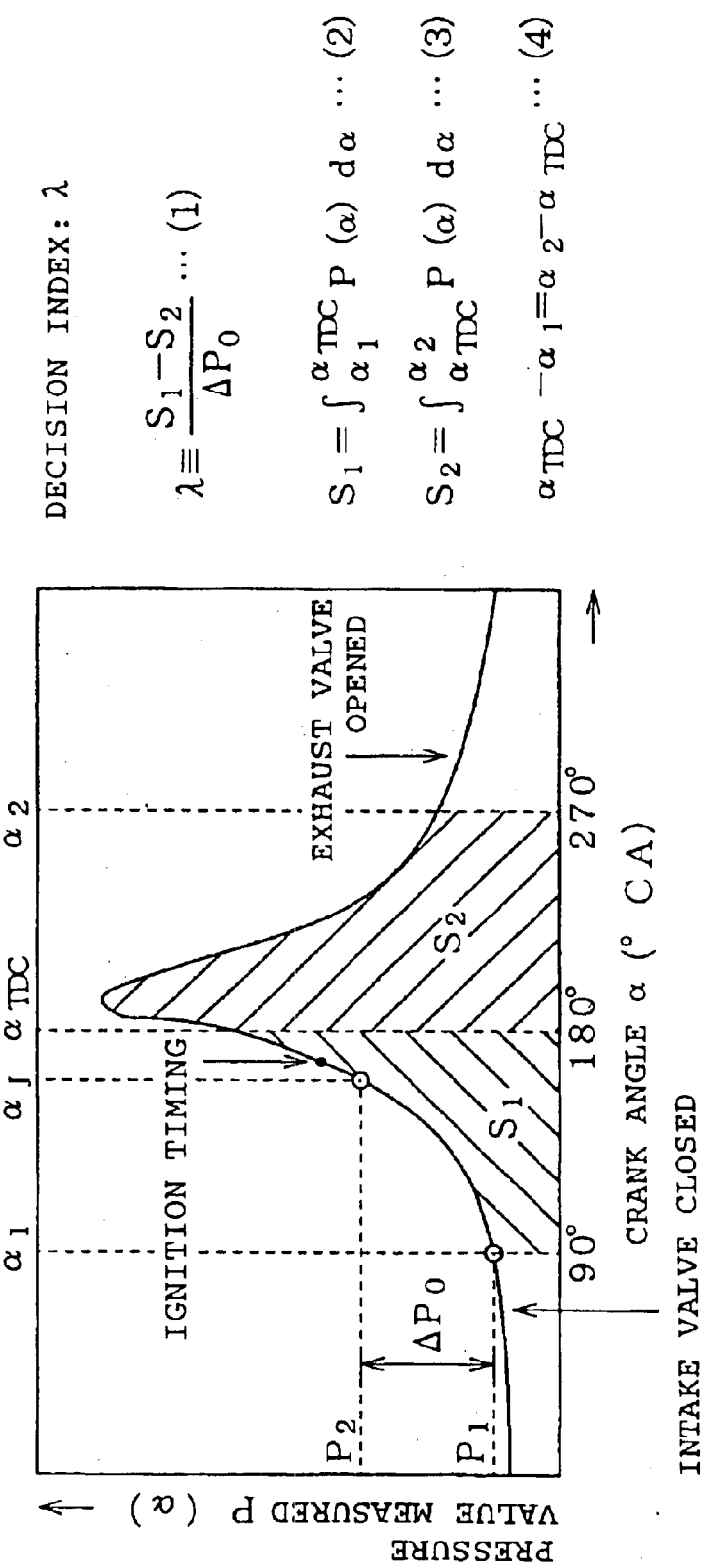
FIG. 4 is a diagram explaining a method for calculating a decision index X from the internal pressure measured profile of FIG. 3.
Figure 5:
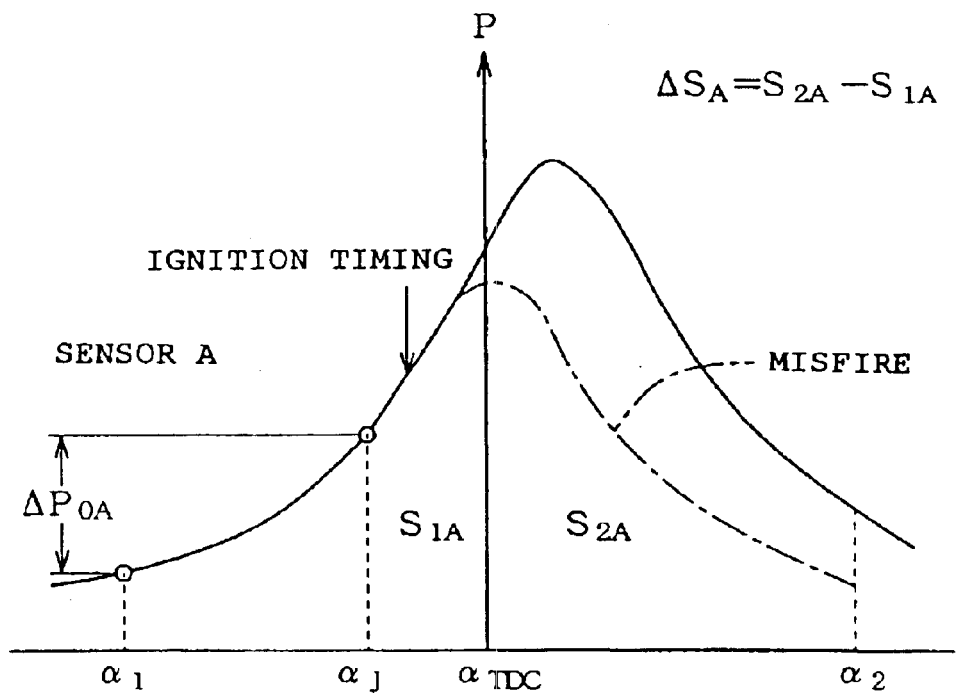
FIGS. 5(a) and 5(b) are diagrams explaining the behaviors in which the internal pressure measured values fluctuate in levels.
Figure 5:
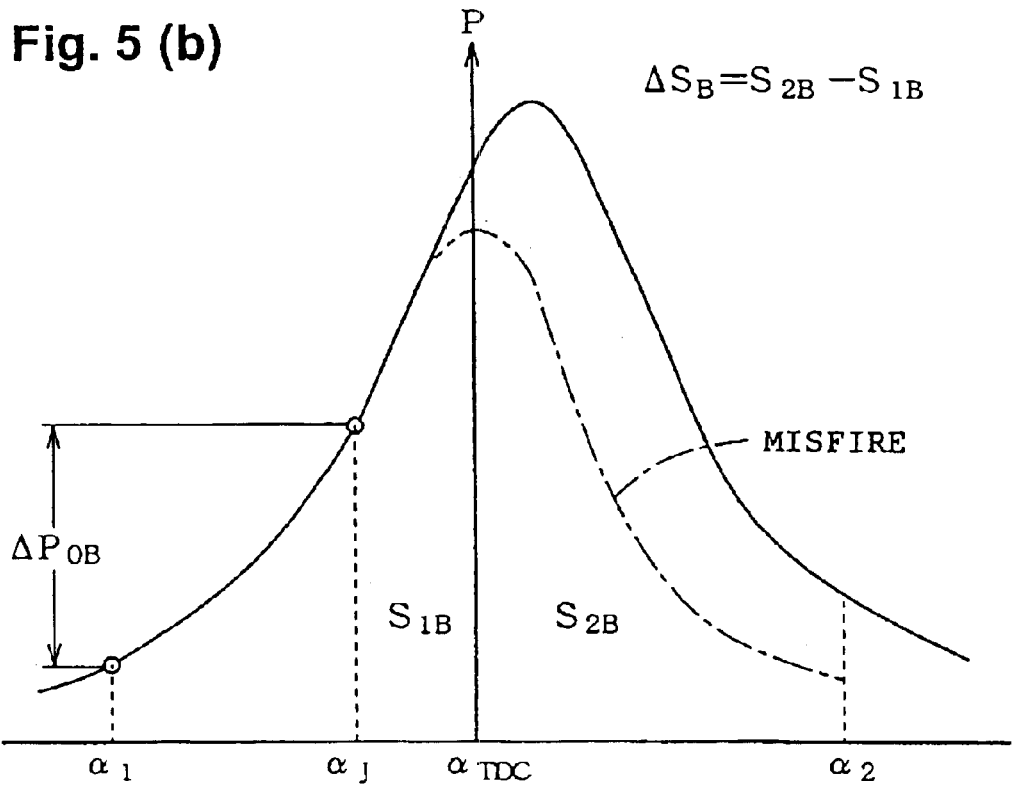
Figure 6:
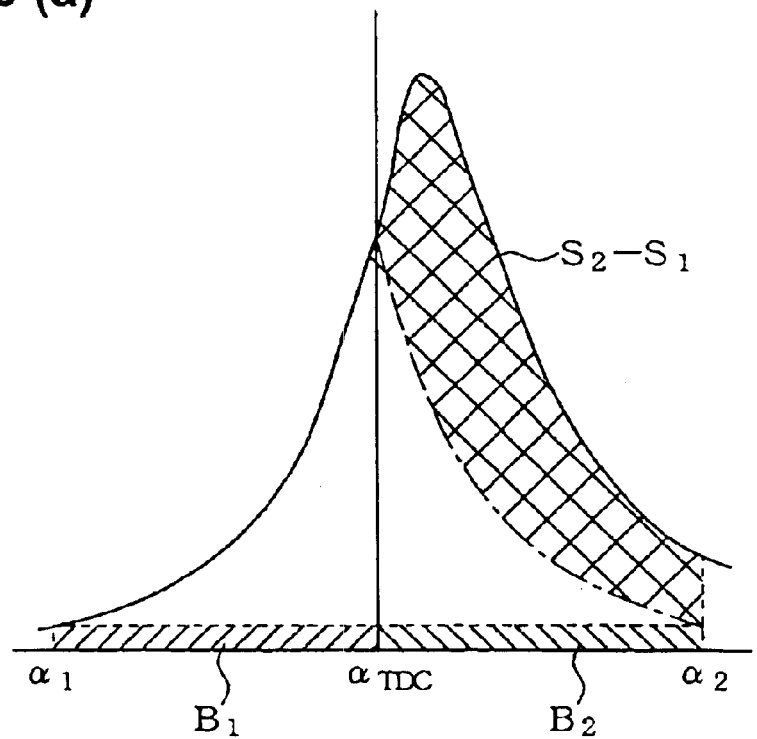
FIGS. 6(a) and 6(b) are diagrams explaining the influences of temperature drifts on the internal pressure measured profile.
Figure 6:
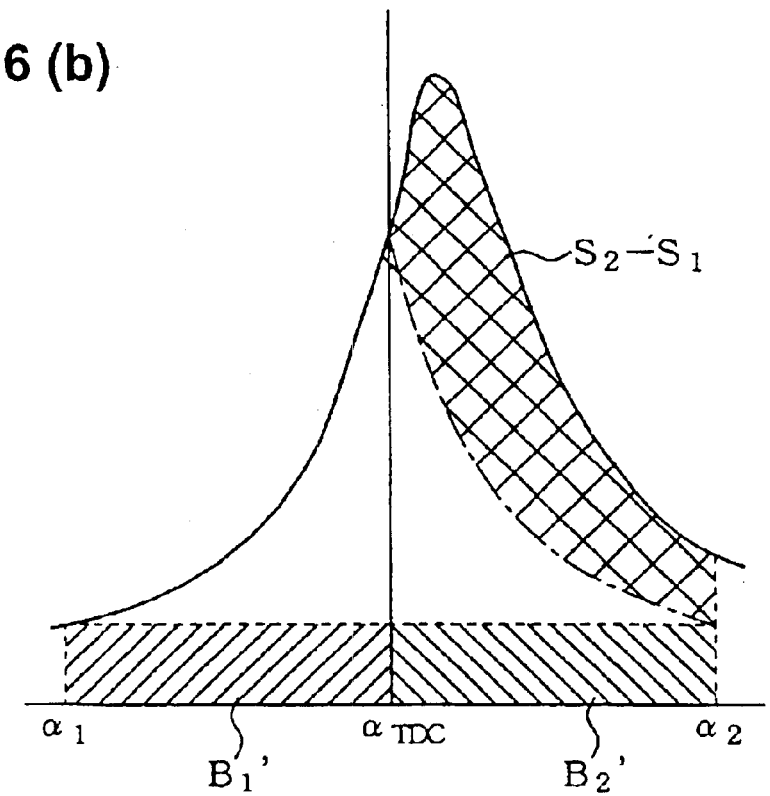
Figure 7:
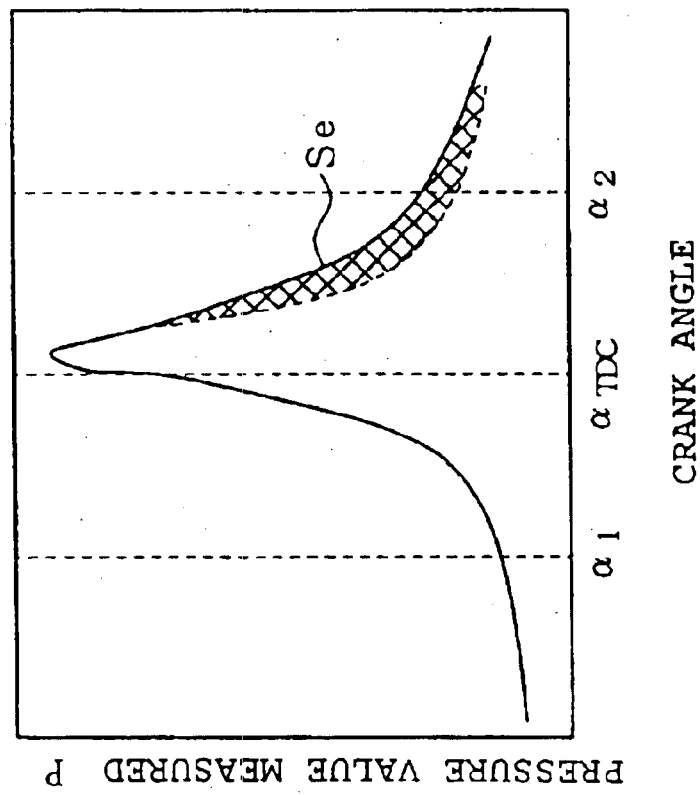
FIGS. 7(a) and 7(b) are explanatory diagrams of the hysteresis occuring in the internal pressure measured profiles.
Figure 7:
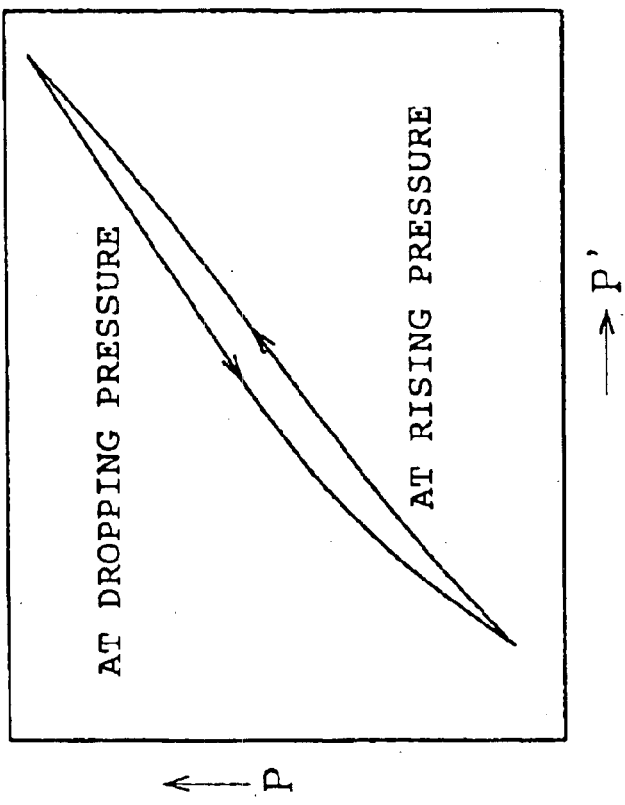
Figure 8:
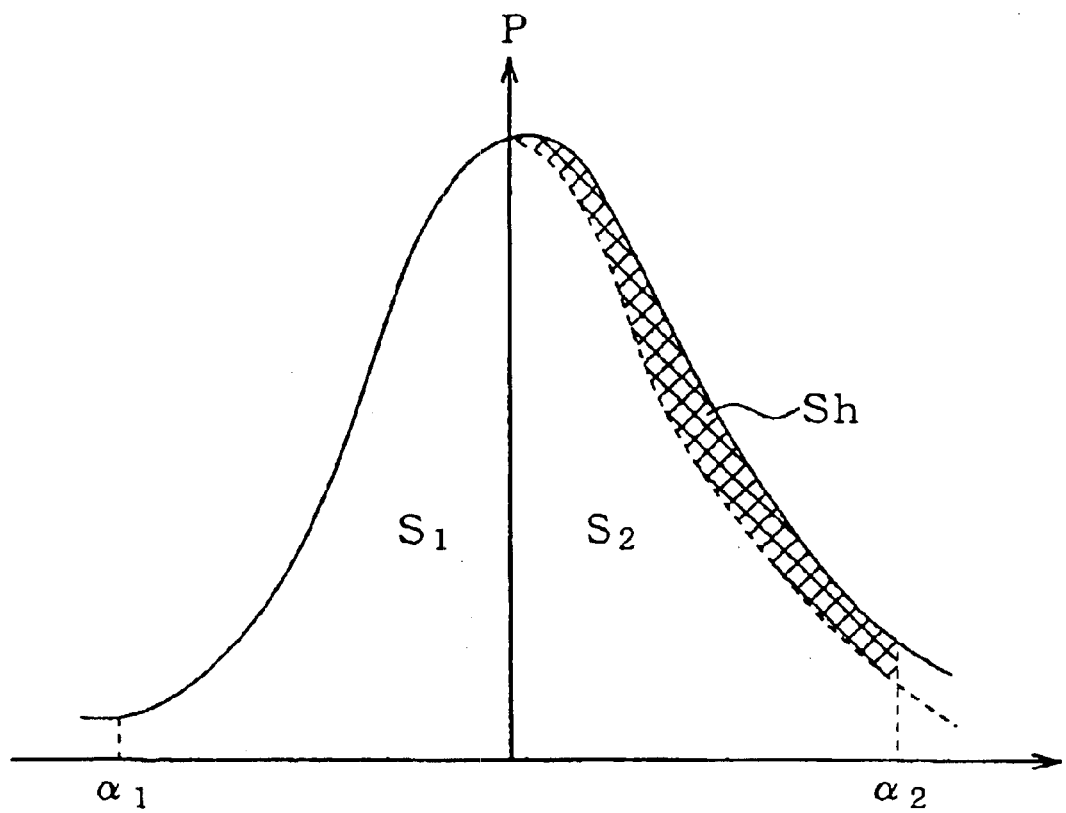
FIG. 8 is a diagram explaining the influences of the hysteresis to appearing in the internal pressure measured profile at the misfire time.
Figure 9:
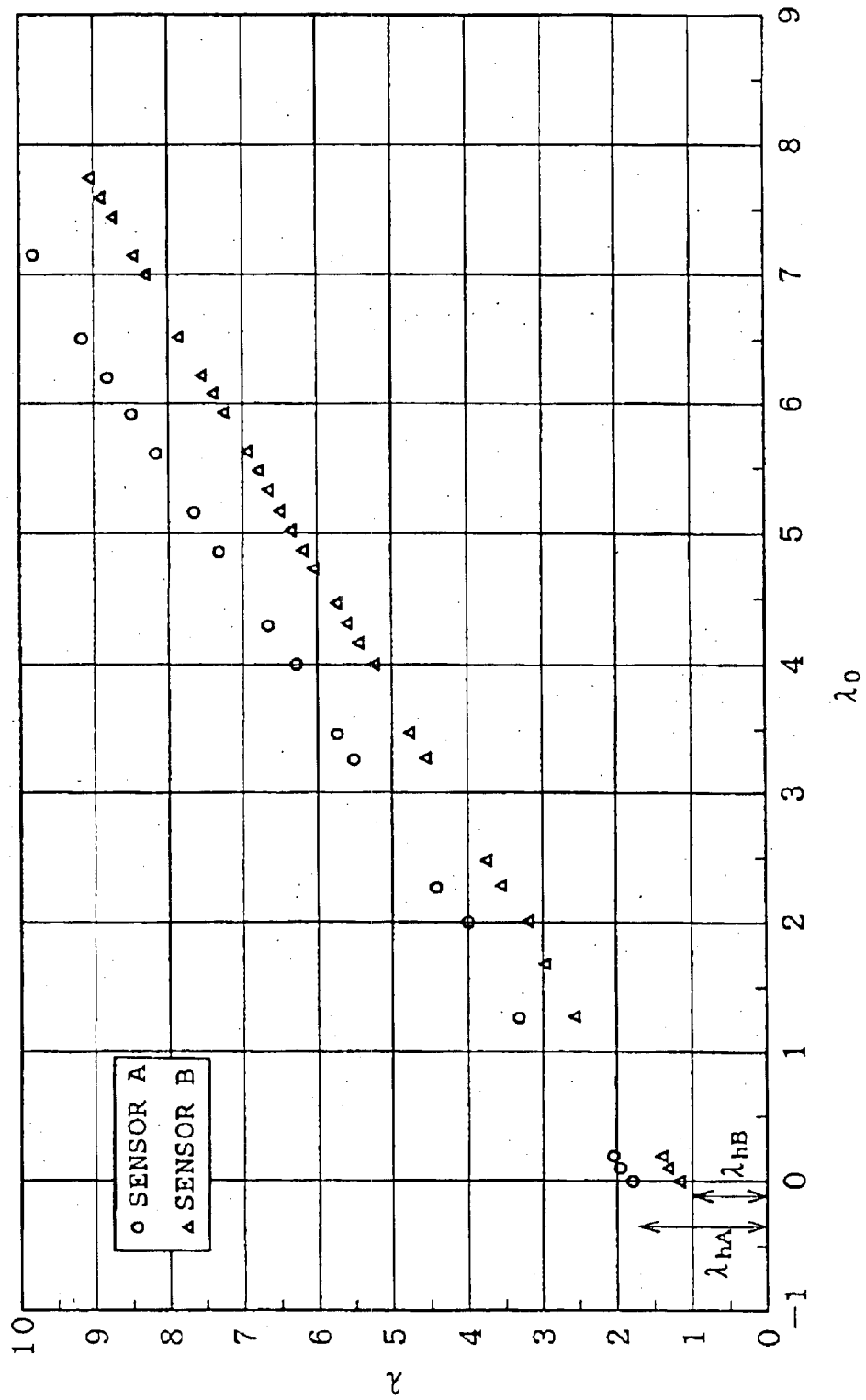
FIG. 9 is a diagram plotting the behavior in which the levels of the hysteresis are made different between individual sensors.

The output of the charge amplifier circuit 11 is inputted as an internal pressure measured value signal through a voltage follower 16 and an A/D converter 17 to a predetermined port of the input/output interface 6. In this embodiment, on the other hand, a before top dead center pressure integrated value $S_1$ and an after top dead center pressure integrated value $S_2$ are calculated on the basis of the internal pressure measured value signal, as shown in FIG. 4, and are used to make the misfire decision. Therefore, the output of the charge amplifier circuit 11 is branched and inputted to an integration circuit 24.

In this integration circuit 24, the branched output of the charge amplifier circuit 11 is inputted through a voltage follower circuit 18 to an operation amplifier 19 forming a well-known integrator, with which a resistor 21 and a negative feedback capacitor 20 are connected. The integrated output of the integration circuit 24 is inputted to a predetermined port of the input/output interface 6 through an A/D converter 23. In order to clear the output of the integration circuit 24 for each cycle of combustion, a switch circuit (as exemplified by a photo-MOS relay) 22 is connected with the negative feedback capacitor 20 for earthing/discharging the negative feedback capacitor 20 in response to an action command signal from the ECU 2.

In the system of this embodiment, the integration circuit 24 integrates the output of the charge amplifier circuit 11, i.e., the internal pressure measured value P with time t. Strictly speaking, therefore, this value is not the integrated value which is expressed by the angle $\alpha$ of Formulae (2) and (3) of FIG. 4. If the interval of the input pulses from the crank angle sensor 7 is measured by a clock counter, however, the prevailing engine speed, i.e., the duration of one cycle (which may be an average value of a predetermined number of immediately preceding cycles, for example) can be calculated in real time. Therefore, the time-integrated value obtained can be transformed into the integrated value by the angle $\alpha$, if it is divided by the duration of one cycle. Here, the aforementioned time-integrated value can be used as it is, if the influence of the engine speed fluctuations at the misfire measuring time is low.

The misfire decision processing flow will be described with reference to the explanatory diagram of FIG. 4 and the flow chart of FIG. 10 considering the case using a decision index $\lambda$ (although the memories of individual variables to be used in this processing are formed in the RAM 5 of FIG. 2). First of all, the signal of a crank angle $\alpha$ is inputted, as shown in FIG. 2, as the pulse signal outputted by the crank angle sensor 7 and is added by the $\alpha$-counter in the RAM 5. This added value of the $\alpha$-counter indicates the prevailing crank angle (although the crank angle sensor 7 could be exemplified by an absolute type pulse generator while eliminating the $\alpha$-counter). At S1 of FIG. 10, moreover, the routine is initialized by resetting the $\alpha$-counter and by activating the switching circuit 22 of FIG. 2 to reset the integrated output of the integrator. After these resets, the addition of the $\alpha$-counter at S2 is started according to the execution of the cycle starting job by the ECU 2.

After this, the addition of the $\alpha$-counter is continued on standby until the arrival of the sampling timing of the predetermined internal pressure measured value P and its integrated value S. Specifically, the routine is on standby at S3 for reading the input ports of the internal pressure measured signal and its integrated value, and the α-counter is read at S4. At S5, moreover, it is judged whether or not the crank angle α indicated by the α-counter has reached a starting point α1 (or a point for setting a first one of the aforementioned two correction measurement points in this embodiment) of the before top dead center integration period set to a period after an intake valve is closed. If this answer is NO, the routine returns to S3 to repeat the subsequent operations. If YES, the routine advances to the operations at and after S6.

At S6, the internal pressure measured value P is read in response to the arrival of the first correction measurement point and is set as the aforementioned value $P_1$ in the memory. Moreover, the switching circuit 22 is turned off to release the integrator from the reset state at S7. As a result, the integration of the internal pressure measured value P is started at and after the starting point α1. Then, the standby is restored again for sampling at S8, and it is judged at S9 whether or not the value cc has reached the second one of the two correction measurement points. If the answer is NO, the routine returns to S8, at which the subsequent operations are repeated. If YES, the routine advances to the operations at and after S10.

At S10, the internal pressure measured value P is read in response to the arrival of the second correction measurement point and is set as the aforementioned value $P_2$ in the memory. At S11, moreover, the aforementioned value $\Delta P_0 = P_2 - P_1$ is calculated and set in the memory. At S12, moreover, the standby is made for the sampling. At S13, it is judged whether or not the value α has reached a top dead center angle αTDC. If the answer is NO, the routine returns to S12, and the subsequent operations are repeated. If YES, the routine advances to the operations at and after S14.

At S14, the input value from the integrator is read. This value indicates the before top dead center pressure integrated value $S_1$ (of Formula (2) of FIG. 4) and is set as the value $S_1$ in the memory. Here, the input value from the integrator is the time-integrated value of the value P as described above. The duration T of one cycle is determined from the input pulse interval from the crank angle sensor 7, and the crank angle α is transformed into the integrated value by dividing it with the duration T, although omitted from the flow chart. At S15, the standby is restored again for the sampling, and it is judged at S16 whether or not the value α has reached the ending point α2 of the integration period of the after top dead center pressure integrated value $S_2$. If the answer is NO, the routine returns to S15, and the subsequent operations are repeated. If YES, the routine advances to operations at and after S17.

At S17, the input value of the integrator is read again according to the arrival of the ending point α2. This value indicates the integrated value from α1 to α2, i.e., $S_p = S_1 + S_2$ and is set in the memory. At S18, the value $S_2$ is calculated as the value of $S_p - S_1$. Then, the routine advances to S19, at which the value of the aforementioned decision index λ is calculated by using the calculated values $S_1$, $S_2$ and $\Delta P_0$.

Next at S20, there is read a correction value $\lambda_{hp}$ for the aforementioned hysteresis correction, which has been calculated and stored in the preceding routine. At S21, a correction is made to calculate the final corrected decision index λ' by subtracting the correction value $\lambda_{hp}$ from the decision index λ already obtained. At S22, this value λ' is compared with a decision reference value (or an upper limit value) $\lambda_c$, and the decision of misfire is made if $\lambda' < \lambda_c$. The ECU 2 of FIG. 2 outputs a predetermined misfire decision (FIG. 10: S23) from a decision output port of the input/output interface 6.

Figure 10:
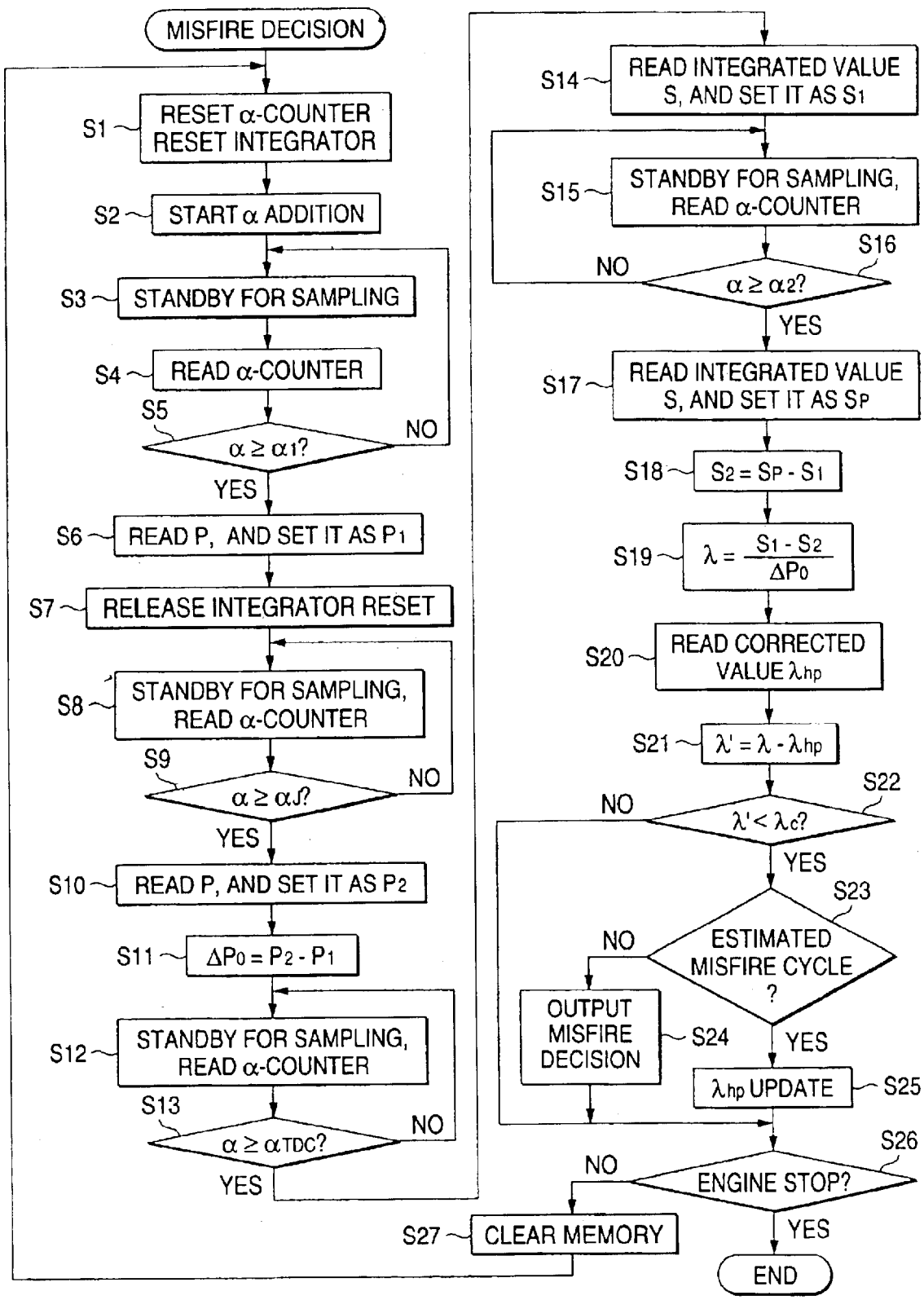
FIG. 10 is a flow chart showing the flow of a misfire deciding routine in the misfire decision unit of FIG. 2.

In case this cycle is an estimated misfire cycle such as a fuel cut cycle intended from the beginning by the ECU 2, the routine advances to S25 in FIG. 10. At S25, the correction value $\lambda_{hp}$ is updated by using the decision index λ before the correction, which has been obtained in that cycle. FIG. 11 shows the updating method schematically. For calculating the value λ, it is necessary to calculate a differential integrated value ΔS for each estimated misfire cycle. Here, the differential integrated value is used as a correction value so that it is expressed by $\Delta S_h$ and is further suffixed into $\Delta S_{h1}$, $\Delta S_{h2}$, - - - , and $\Delta S_{hk}$ so as to correspond to the time series array of the estimated misfire cycle. In a relatively convenient method, the differential integrated value is calculated as an average value $\Delta_{hm}$ of the values $\Delta S_h$ which are obtained in a plurality of (e.g., an N-number of) preceding estimated misfire cycles, as indicated by [1] in FIG. 11.

By an accidental cause, on the other hand, the value $\Delta S_h$ obtained in an estimated misfire cycle may take such a numerical value as extraordinarily deviates from the tendency of the preceding $\Delta S_h$. Therefore, the following method can be adopted as one for obtaining the corrected value $\lambda_{hp}$ of a higher reliability by reducing the influence of the extraordinary value. In this method, the product value of the average value $\Delta S_{hm}$ of the values $\Delta S_h$ of the just preceding N-number and the term $\beta/(1-\beta)$ by using a correction coefficient β is used as a predicted value ΔShp of a next value ΔShi, as indicated by [2] in FIG. 11. By using the predicted value $\Delta S_{hp}$ and the actually measured $\Delta S_{hi}$, moreover, a correction factor $A_i$ is calculated for each estimated misfire cycle from a Formula [3] of FIG. 11. The aforementioned correction coefficient β is calculated as an average value of the correction factors $A_i$ which have already been obtained in the just preceding N-number of estimated misfire cycles, by Formula [4] of FIG. 11.

The value $A_i$ is so clarified, if modified into [3]' by dividing the denominator and numerator of Formula [3] individually by $\Delta S_{hi}$, as to come closer to ½ if the difference between the result value ($\Delta S_{hi}$) and the predicted value ($\Delta S_{hp}$) relating to the value $\Delta S_h$ becomes smaller, to 1 if the result value becomes larger from the predicted value, and to 0 if smaller on the contrary. Therefore, the correction coefficient β or the average value of the values $A_i$ also becomes closer to ½ (as will be termed into the "pattern 1") as the number of cycles of smaller difference between the result value and the predicted value becomes larger in the product of $\Delta S_h$ in the past estimated misfire cycles, to 1 (as will be termed into the "pattern 2") as the number of cycles, in which the result value is far higher than the predicted value, becomes larger, and to 0 (as will be termed into the "pattern 3") as the number of cycles, in which the result value is far lower on the contrary, becomes larger.

In this case, the value of $\beta/(1-\beta)$ approaches closer to 1 in the pattern 1. In other words, the difference between the result value and the predicted value is intrinsically small so that the effect of correction can be reduced. In the pattern 2, on the other hand, the value of $\beta/(1-\beta)$ is inversely higher as the difference of the result value from the predicted value is larger. Therefore, the predicted value becomes higher toward the result value so that the correction precision is enhanced. In the pattern 3, on the other hand, the value of $\beta/(1-\beta)$ approaches closer to 0 as the difference of the result value from the predicted value becomes larger. In other words, the predicted value becomes smaller toward the result value so that the correction accuracy is likewise enhanced. Here, each value ΔSh can be transformed into the value $\lambda_{hp}$ by dividing it by the corresponding value $\Delta P_0$. In this case, a correction factor A using the λ and the correction coefficient β can be likewise calculated by replacing the value $\Delta S_h$ by the value λhp in Formulae [3] and [4] of FIG. 11.

Figure 17:
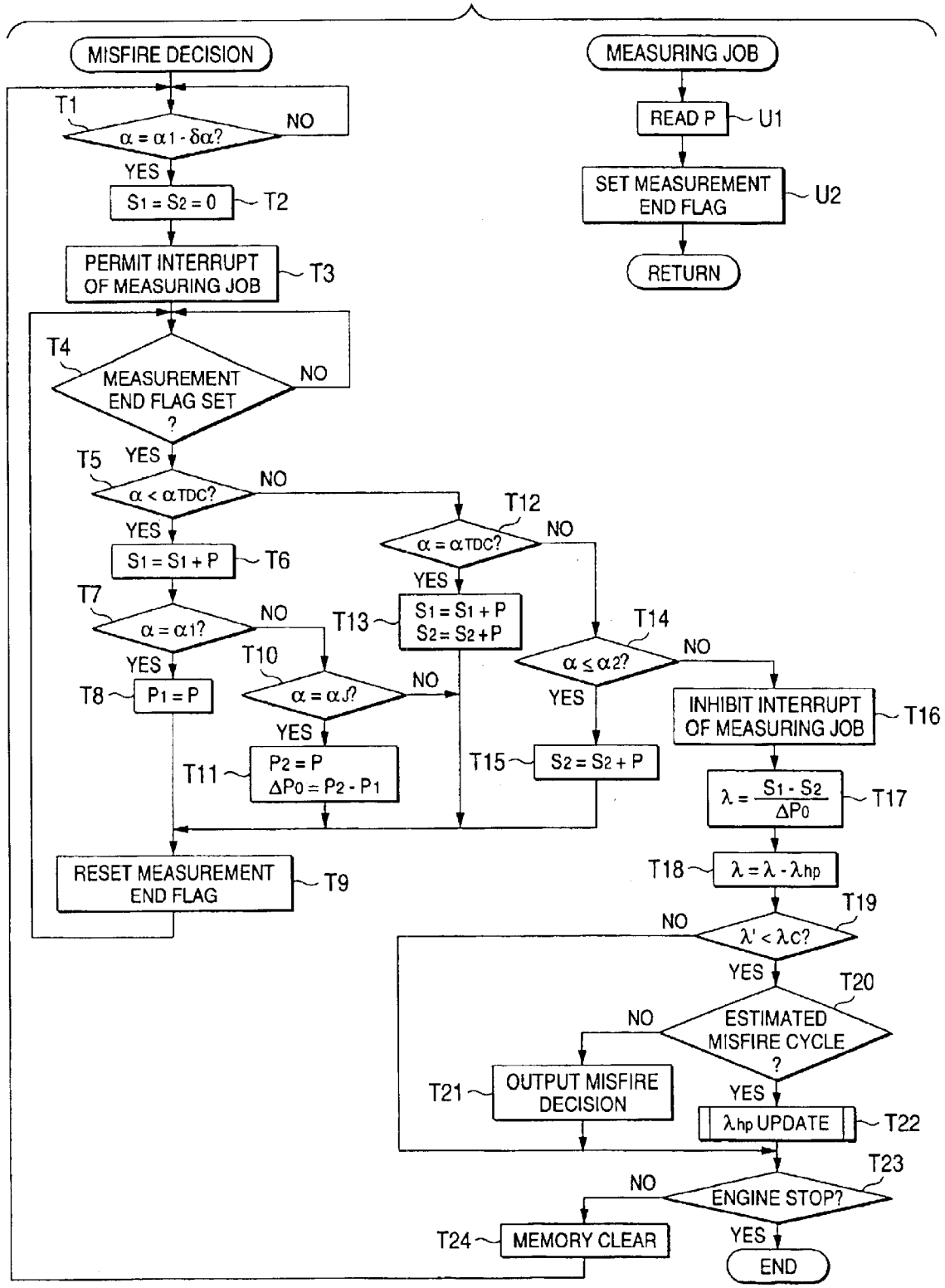
FIG. 17 is a flow chart showing the flow of a misfire deciding routine of the case in which the integrations are made by software operations.

Here, the aforementioned integrations can be made by a software in the ECU 2, and the integration circuit 24 of FIG. 2 can then be omitted. It is also easily realized by processing a program to acquire the integrated value with the angle α by using the input pulse interval from the crank angle sensor 7. One example of this processing will be described with reference to a flow chart of FIG. 17. Here, the internal pressure measured value P is read (for a measuring job) by an interrupting operation for every increment δα of the certain c rank angle α, and the added value of the values P is calculated as an integrated value.

At T1, it is judged whether or not the crank angle α indicated by the α-counter has reached the timing just before a starting point α1 of the before top dead center integration period, i.e., α1 −δα. If the answer is NO, a standby is made while continuing the addition of the α-counter. If YES, the routine advances to T2, at which the integration memories $S_1$ and $S_2$ are cleared. At T3, the interrupt of the measured job is permitted (to release the mask of an interrupt terminal). From now on, the value P is read at each δα and is stored in an overwritten shape in the P memory of the RAM 5 (FIG. 2).

The measuring job includes two steps of reading (U1) the internal pressure measured value P and setting (U2) a measurement end flag indicating that the reading(or measurement) of the value P has completed. In the misfire deciding main job, it is judged by confirming the contents of the measurement end flag at T4 whether or not the value P has been updated by the latest measured value. If this answer is YES, the routine advances to T5, at which the prevailing crank angle α is read. If this angle α is smaller than the value αTDC, the routine advances to T6, at which the value P is added to the integration memory of S1. Moreover, it is confirmed at T7 whether or not the value α has reached α1. If this answer is YES, the routine advances to T8, at which the prevailing value P is stored as the aforementioned value $P_1$. At T9, the measurement end flag is reset, and the routine is returned to T4. After this, these operations are repeated. If it is judged at T7 that the value α is larger than α1, on the other hand, the routine advances to T10, at which it is judged whether or not the aforementioned value αJ has been reached. If this answer is YES, the routine advances to T11, at which the prevailing value P is stored as the aforementioned $P_2$ and at which the value $\Delta P_0$ is calculated and stored as $P_2-P_1$, (otherwise the routine skips T11). After this, at T9, the measurement end flag is reset, and the routine is returned to T4 to repeat the subsequent operations.

If it is judged at T5 that the value α is not smaller than αTDC, the routine advances to T12. If it is judged at T12 that the value α is equal to αTDC, the routine advances to T13. At T13, the final addition of P to $S_1$ is made, and the addition of P to $S_2$ is started. The routine is returned through T9 to T4. This is because the value P at αTDC belongs to both $S_1$ and $S_2$. If the value δα is sufficiently small, the operation can be done assuming that the value P at αTDC belongs to either $S_1$ or $S_2$. If it is judged at T12 that the value α is larger than αTDC, on the other hand, the routine advances to T14, at which it is judged that the value α is no more than α2. If this answer is YES, the routine advances to T15, at which the addition of P to $S_2$ is continued. If NO, on the other hand, the routine advances to T16, at which the interruption of the measuring job is inhibited (that is, the interruption terminal is masked) to end the integrating operations and to advance to T17. The operations at and after T17 will be omitted on their description, because they are similar to those at and after S19 of FIG. 10.

Here will be described the results of experiments which have been performed for confirming the effects of the invention.

Figure 12:
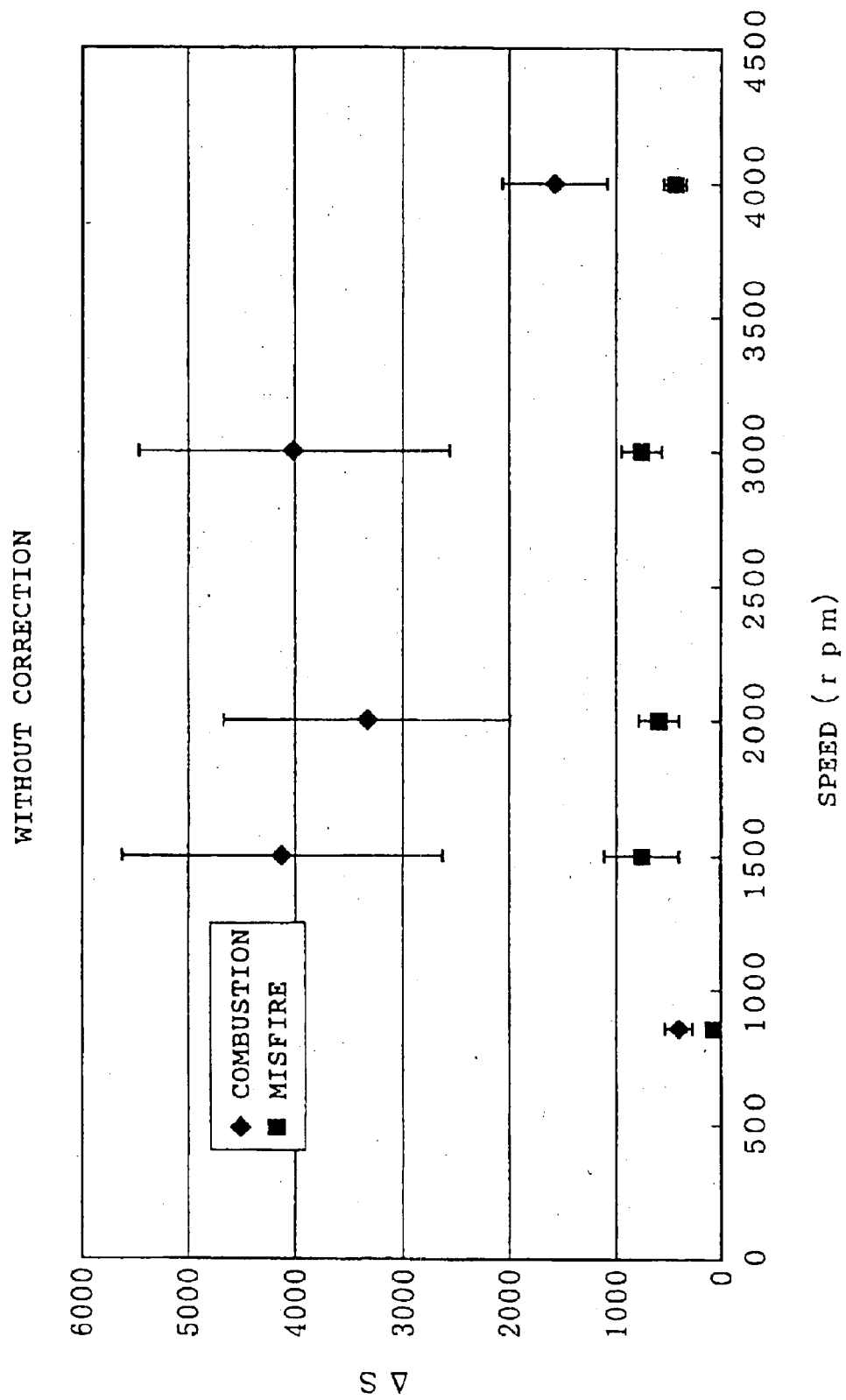
FIG. 12 is a first graph plotting the experimental results made for confirming the effects of the invention.
Figure 13:
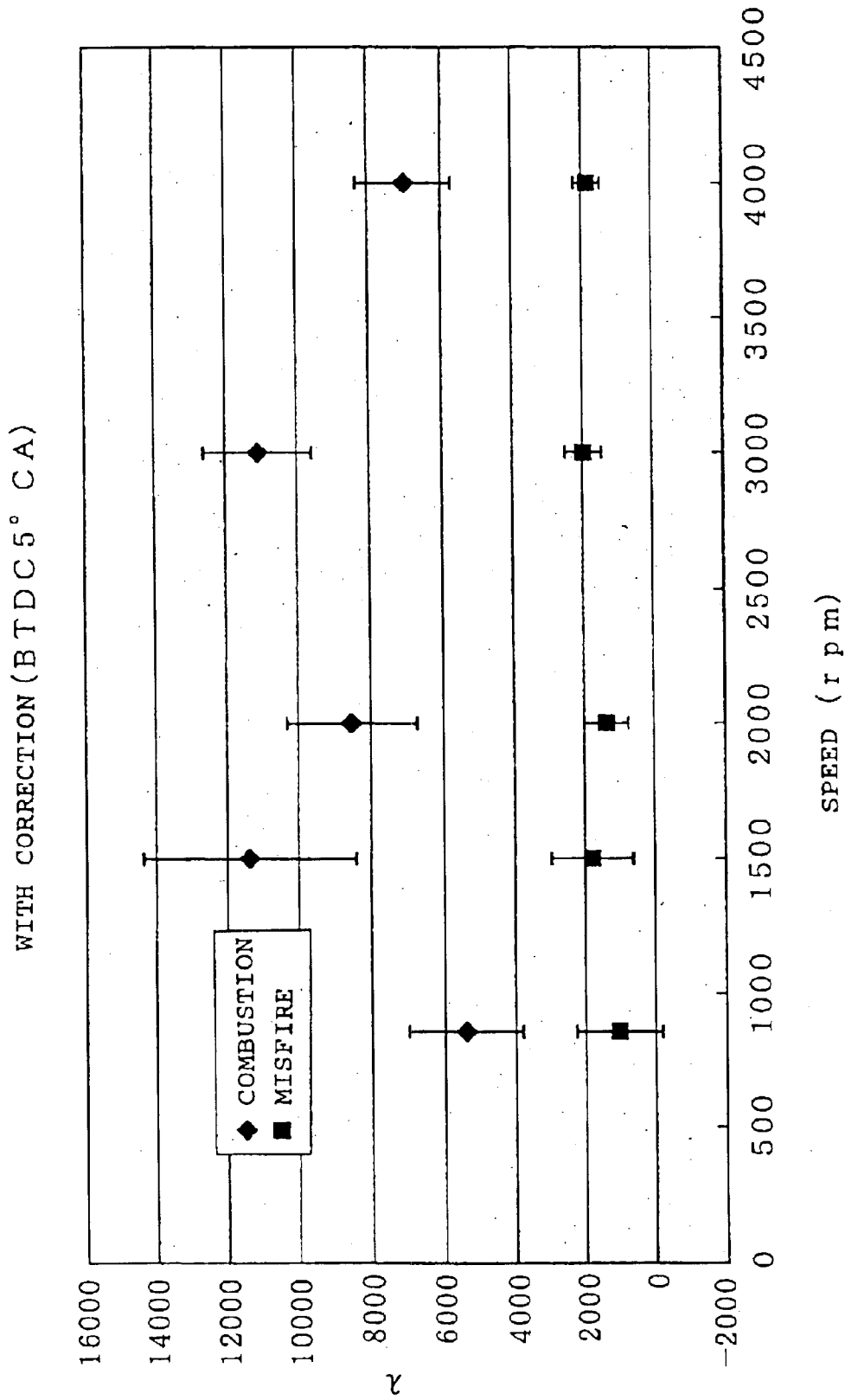
FIG. 13 is a second graph of the same.
Figure 14:
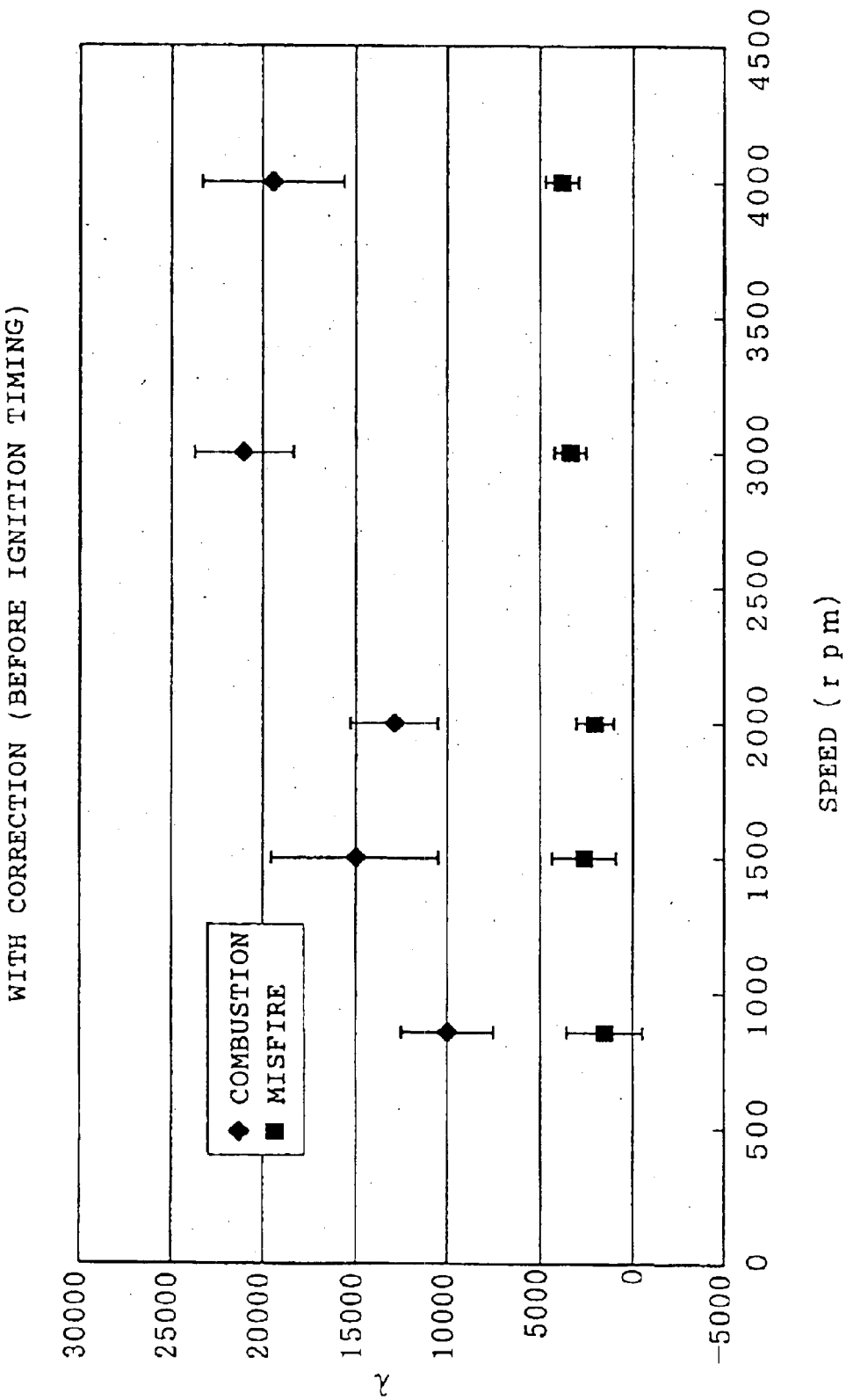
FIG. 14 is a third graph of the same.
Figure 15:
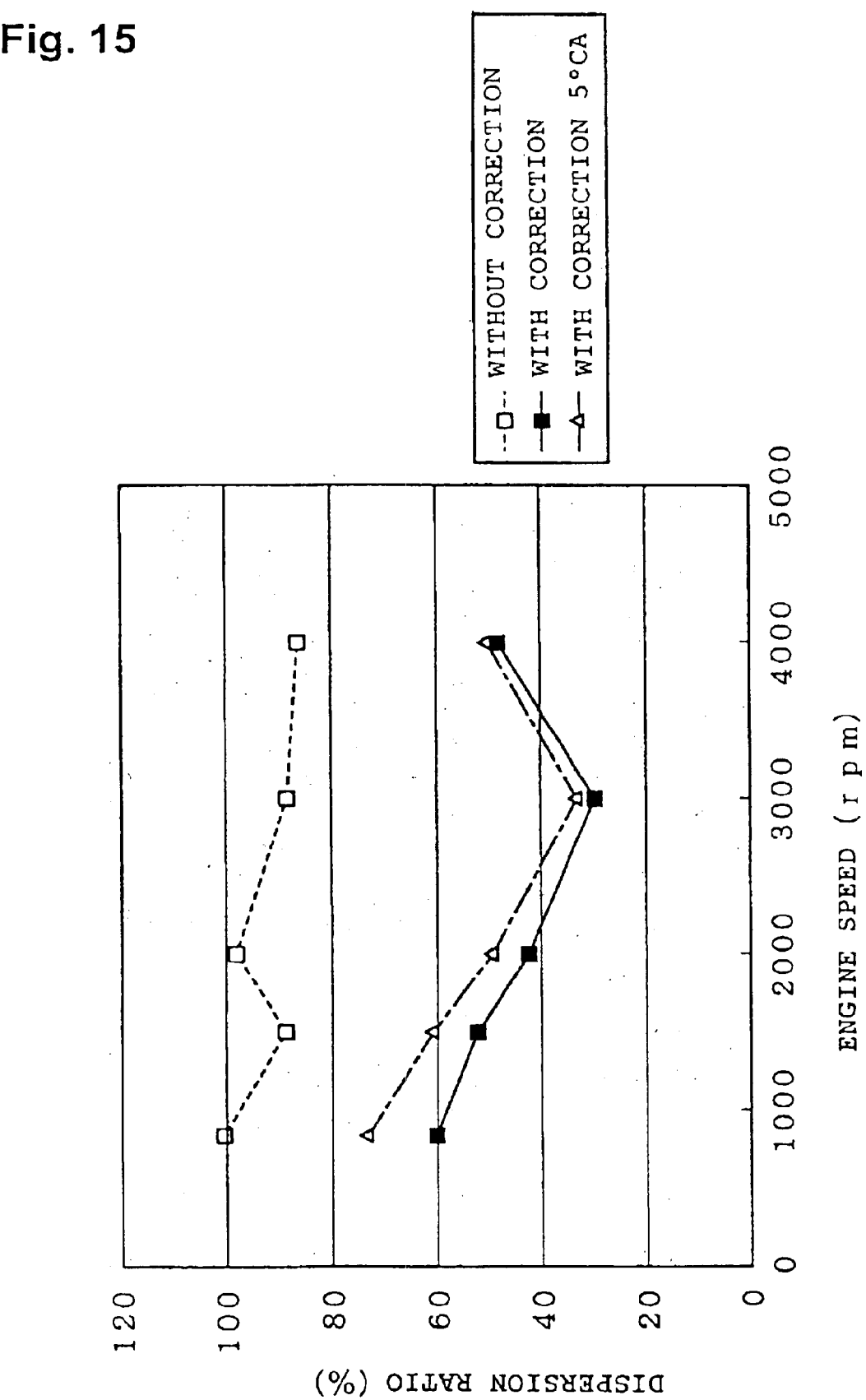
FIG. 15 is a fourth graph of the same.

First of all, ten gasket type pressure sensors identical to that shown in FIG. 1 were prepared and were attached together with spark plugs to a four-cylinder gasoline engine having a displacement of 2,000 cc. This engine was run at various engine speeds by setting the ignition timing at 15 degrees of before top dead center (BTDC) and a misfire decision was made by a decision unit in FIG. 2. FIG. 12 plots the results of misfire decisions based on the value of the aforementioned differential integral value ΔS. Solid diamonds plot the average values of ΔS of the cycle decided as a normal combustion, together with their distribution ranges (as indicated by error bars). The solid squares plot the average values of ΔS of the cycle decided as a misfire, together with their dispersion ranges. According to this graph, it is implied that the decisions could be made without any serious problem for a high RPM range, but that the distributions of the values for deciding the normal combustion and the misfire were so close to each other for a low RPM range that an erroneous decision was probable. On the other hand, FIG. 13 plots similar experimental results of the case in which the misfire decision is made by using the aforementioned decision index λ. Here, the first correction measuring point was set at the integration period starting point α1 and at a BTDC of 90 degrees, and the second correction measuring point was set at BTDC of 5 degrees after the ignition timing. It is seen, as compared with FIG. 12, that the ratio of the dispersion range to the average value of λ was reduced in a low RPM range so that the decision accuracy was improved. Moreover, FIG. 14 plots the case in which the second correction measuring point was set at a BTDC of 20 degrees before the ignition timing, and imdicates that the dispersion range ratio in the low speed range was further reduced. FIG. 15 summarizes the dispersion range ratios to the average value at every speed for the foregoing three results. It is apparent that the setting of the second correction measuring point before the ignition timing gave the most excellent result.

Figure 16:
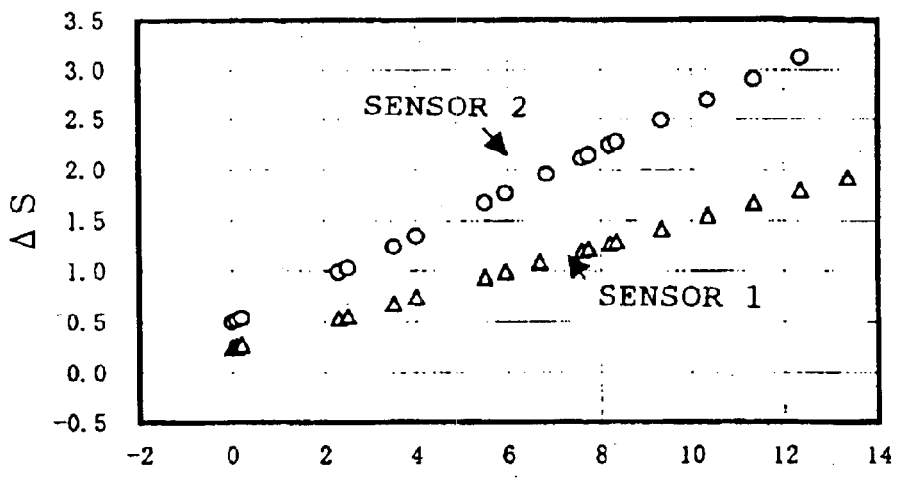
FIGS. 16(a), 16(b) and 16(c) are graphs explaining the behavior in which the influences of variations between individual sensors are lessened by corrections.
Figure 16:
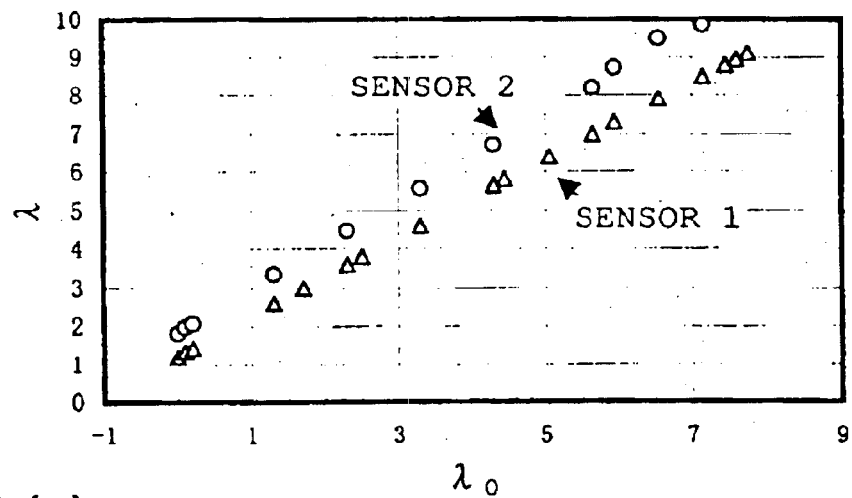
Figure 16:
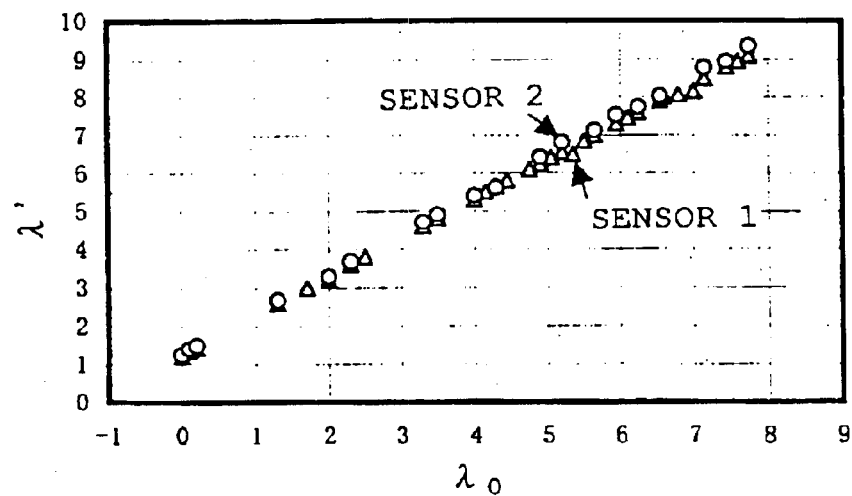

For two different sensors, on the other hand, FIG. 16(a) shows an example, in which the differential integration values ΔS obtained by using the gasket type pressure sensor are plotted against the differential integration values $\Delta S_0$ obtained by using the standard sensor. Both the sensors caused generally linear changes of ΔS against $\Delta S_0$ but a large difference in the values of the gradient and the intercept. Next, FIG. 16(b) plots the decision indexes λ, which were obtained by dividing the differential integration values of the two sensors by the value $\Delta P_0$, against the similar decision indexes $\lambda_0$ which were obtained by using the standard sensor. It is found that the difference in the gradient between the two straight lines was remarkably reduced. Moreover, FIG. 16(c) plots the decision indexes λ', which were obtained by the hysteresis correction to subtract the correction value $\lambda_{hp}$ from the decision index λ, against the value $\lambda_0$. It was found that the differences in both the gradient and the intercept between the two straight lines were remarkably reduced, and that a constant misfire deciding circumstance could always be realized independently of the sensors used.

It should further be apparent to those skilled in the art that various changes in form and detail of the invention as shown and described above may be made. It is intended that such changes be included within the spirit and scope of the claims appended hereto.

This application is based on Japanese Patent Application No. 2001-135613 filed May 2, 2001, the disclosure of which is incorporated herein by reference in its entirety.

What is claimed is:

1. A misfire deciding method for an internal combustion engine, which comprises:

acquiring an internal pressure measured value based on the internal pressure of an internal combustion engine, to which a spark plug is attached, from the output of a pressure sensor mounted in a mounting seat of said spark plug;

calculating the integrated value of said internal pressure measured values for a first constant integration period after an intake valve is closed and before a crank angle reaches top dead center, and setting the calculated value to a before top dead center integrated value $S_1$;

calculating the integrated value of said internal pressure measured values for a second constant integration period after said crank angle reaches top dead center and before an exhaust valve is opened, and setting the calculated value to an after top dead center integrated value $S_2$;

calculating a differential integrated value $S_1-S_2$ between said after top dead center integrated value $S_2$ and said before top dead center integrated value $S_1$; and calculating a first correction reference value using the internal pressure measured value at a correction measurement point set for said first integration period, to correct said differential integrated value with said first correction reference value, and making a misfire decision on the basis of the corrected differential integrated value.

2. The misfire deciding method for an internal combustion engine as claimed in claim 1, which comprises setting said first and second integration periods to an equal length.

3. The misfire deciding method for an internal combustion engine as claimed in claim 1, which comprises setting the ending point of said first integration period and the starting point of said second integration period at top dead center.

4. The misfire deciding method for an internal combustion engine as claimed in claim 1, which comprises setting said correction measurement point prior to ignition timing for the first integration period.

5. The misfire deciding method for an internal combustion engine as claimed in claim 1, which comprises setting two different points for said correction measurement point to calculate said first correction reference value as a difference $\Delta P_0$ between internal pressure measured values obtained at said two correction measurement points.

6. The misfire deciding method for an internal combustion engine as claimed in claim 5, which comprises calculating the value of $(S_1-S_2)/\Delta P_0$ calculated by dividing said differential integrated value of $S_1-S_2$ by the difference $\Delta P_0$ of said internal pressure measured value or said first correction reference value as a decision index $\lambda$, and making said misfire decision on the basis of said decision index $\lambda$.

7. The misfire deciding method for an internal combustion engine as claimed in claim 6, which comprises calculating a second correction reference value on the basis of said internal pressure measured value of a combustion cycle estimated in advance to be a misfire cycle, and correcting said differential integrated value with said second correction reference value.

8. The misfire deciding method for an internal combustion engine as claimed in claim 7, which comprises calculating said second correction reference value as a value reflecting said differential integrated value in said estimated misfire cycle.

9. The misfire deciding method for an internal combustion engine as claimed in claim 8, which comprises using said decision index $\lambda$ obtained in said estimated misfire cycle, as a correction value $\lambda_{hp}$ for said second correction reference value, and correcting said decision index $\lambda$ obtained in a combustion cycle other than said estimated misfire cycle by subtracting said correction value $\lambda_{hp}$.

10. The misfire deciding method for an internal combustion engine as claimed in claim 7, which comprises calculating said second correction reference value on the basis of said internal pressure measured value in a plurality of previously occurring estimated misfire cycles.

11. A misfire deciding system for an internal combustion engine, comprising:

a pressure sensor mounted in a mounting seat of a spark plug for acquiring an internal pressure measured value based on the internal pressure of an internal combustion engine having the spark plug mounted therein; and a decision unit for: calculating the integrated value of said internal pressure measured values for a first constant integration period after an intake valve is closed and before a crank angle reaches the top dead center, and setting the calculated value to a before top dead center integrated value $S_1$; calculating the integrated value of said internal pressure measured values for a second constant integration period after said crank angle reaches top dead center and before an exhaust valve is opened, and setting the calculated value to an after top dead center integrated value $S_2$; calculating a differential integrated value $S_1-S_2$ between said after top dead center integrated value $S_2$ and said before top dead center integrated value $S_1$; and calculating a first correction reference value using the internal pressure measured value at a correction measurement point set for said first integration period, to correct said differential integrated value with said first correction reference value, and making a misfire decision on the basis of the corrected differential integrated value.

* * * * *